(12) United States Patent
Hodges et al.

(10) Patent No.: US 10,784,645 B2
(45) Date of Patent: Sep. 22, 2020

(54) FIBER LASER HAVING VARIABLY WOUND OPTICAL FIBER

(71) Applicant: NLIGHT, INC., Vancouver, WA (US)

(72) Inventors: Aaron Ludwig Hodges, Vancouver, WA (US); Nicolas Meacham, Vancouver, WA (US); Dahv Kliner, Portland, OR (US); Mitchell Ryan Reynolds, Vancouver, WA (US)

(73) Assignee: NLIGHT, INC., Vancouver, WA (US)

( * ) Notice: Subject to any disclaimer, the term of this patent is extended or adjusted under 35 U.S.C. 154(b) by 0 days.

(21) Appl. No.: 16/299,049

(22) Filed: Mar. 11, 2019

(65) Prior Publication Data
US 2019/0280449 A1     Sep. 12, 2019

Related U.S. Application Data

(60) Provisional application No. 62/641,903, filed on Mar. 12, 2018.

(51) Int. Cl.
*H01S 3/30*    (2006.01)
*H01S 3/067*   (2006.01)
(Continued)

(52) U.S. Cl.
CPC .......... *H01S 3/06704* (2013.01); *H01S 3/042* (2013.01); *H01S 3/0407* (2013.01);
(Continued)

(58) Field of Classification Search
CPC .... H01S 3/0407; H01S 3/067; H01S 3/06704; H01S 3/0405; H01S 3/09415
See application file for complete search history.

(56) References Cited

U.S. PATENT DOCUMENTS

| 1,245,674 A | 11/1917 | Bushnell |
| 2,334,219 A | 11/1943 | Roth |

(Continued)

FOREIGN PATENT DOCUMENTS

| DE | 4315580 A1 | 11/1994 |
| DE | 102007023058 A1 | 10/2008 |

(Continued)

OTHER PUBLICATIONS

European Patent Office, International Search Report and Written Opinion in PCT/US2019/021692, dated Jul. 24, 2019, 12 pages.

(Continued)

*Primary Examiner* — Kinam Park
(74) *Attorney, Agent, or Firm* — Schwabe Williamson & Wyatt

(57) ABSTRACT

Some embodiments may include a fiber laser, comprising: a variably wound optical fiber, wherein the variably wound optical fiber includes: a first length arranged in a plurality of first loops with a first separation distance between successive ones of the first loops; and a second length arranged in a plurality of second loops with a second separation distance between successive ones of the second loops; wherein the first separation distance between successive ones of the first loops is greater than the second separation distance between successive ones of the second loops; and packaging to remove heat generated by the optical fiber of the fiber laser during operation of the fiber laser, wherein the variably wound optical fiber is fixably mounted to a surface of a heat conductor of the packaging.

20 Claims, 16 Drawing Sheets

(51) Int. Cl.
*H01S 3/04* (2006.01)
*H01S 3/042* (2006.01)
*H01S 3/0941* (2006.01)

(52) U.S. Cl.
CPC ............ *H01S 3/067* (2013.01); *H01S 3/0405* (2013.01); *H01S 3/09415* (2013.01)

(56) References Cited

U.S. PATENT DOCUMENTS

| | | | |
|---|---|---|---|
| 3,279,532 A | 10/1966 | Pfeil, Jr. | |
| 3,334,684 A | 8/1967 | Mazorol Jr. | |
| 4,338,995 A | 7/1982 | Shelley | |
| 4,712,158 A | 12/1987 | Kikuchi | |
| 4,724,316 A | 2/1988 | Morton | |
| 4,865,123 A | 9/1989 | Kawashima | |
| 5,005,640 A | 4/1991 | Lapinski | |
| 5,043,797 A | 8/1991 | Lopes | |
| 5,088,005 A | 2/1992 | Ciaccio | |
| 5,144,531 A | 9/1992 | Go et al. | |
| 5,173,957 A | 12/1992 | Bergano et al. | |
| 5,222,170 A * | 6/1993 | Bargar | G02B 6/4202 219/121.63 |
| 5,241,414 A | 8/1993 | Giles et al. | |
| 5,333,230 A | 7/1994 | Hata et al. | |
| 5,509,468 A | 4/1996 | Lopez | |
| 5,594,748 A | 1/1997 | Jabr | |
| 5,731,568 A | 3/1998 | Malecek | |
| 5,785,754 A | 7/1998 | Yamamoto | |
| 5,829,516 A | 11/1998 | Lavochkin | |
| 5,899,077 A | 5/1999 | Wright et al. | |
| 5,903,583 A | 5/1999 | Ullman et al. | |
| 5,912,748 A | 6/1999 | Wu et al. | |
| 6,311,764 B1 | 11/2001 | Schulz et al. | |
| 6,351,381 B1 | 2/2002 | Bilski | |
| 6,393,853 B1 | 5/2002 | Vukovic | |
| 6,442,312 B1 | 8/2002 | Terao et al. | |
| 6,517,221 B1 | 2/2003 | Xie | |
| 6,583,926 B1 | 6/2003 | Wu et al. | |
| 6,683,892 B1 | 1/2004 | Yamaura et al. | |
| 6,802,366 B1 | 10/2004 | Dillon et al. | |
| 6,942,019 B2 | 9/2005 | Pikovsky | |
| 7,913,331 B2 | 3/2011 | Hartman | |
| 8,493,651 B1 * | 7/2013 | Hu | H01S 3/06754 359/341.1 |
| 8,881,793 B2 | 11/2014 | Huang | |
| 8,971,359 B2 | 3/2015 | Creeden et al. | |
| 9,285,125 B2 | 3/2016 | Lee et al. | |
| 9,285,126 B2 | 3/2016 | Buttignol | |
| 9,693,489 B2 | 6/2017 | Park | |
| 9,774,063 B2 | 9/2017 | Wayne et al. | |
| 9,897,400 B2 | 2/2018 | Yang | |
| 10,054,369 B2 | 8/2018 | Yang | |
| 10,571,180 B2 | 2/2020 | Knatt | |
| 2002/0001320 A1 | 1/2002 | Itoh | |
| 2003/0116869 A1 | 6/2003 | Siu | |
| 2003/0140636 A1 | 7/2003 | Van Winkle | |
| 2004/0258403 A1 | 12/2004 | Abras et al. | |
| 2005/0103472 A1 | 5/2005 | Loftland et al. | |
| 2005/0113068 A1 | 5/2005 | Hoffmann | |
| 2005/0128705 A1 | 6/2005 | Chu et al. | |
| 2005/0145680 A1 | 7/2005 | Travassaros | |
| 2005/0178530 A1 | 8/2005 | Huang et al. | |
| 2006/0002080 A1 | 1/2006 | Leija et al. | |
| 2006/0027356 A1 | 2/2006 | Sulzer | |
| 2006/0108105 A1 | 5/2006 | Huang et al. | |
| 2006/0191838 A1 | 8/2006 | Lowell | |
| 2006/0196643 A1 | 9/2006 | Hata et al. | |
| 2006/0254752 A1 | 11/2006 | Narakino et al. | |
| 2007/0017656 A1 | 1/2007 | Da Rold | |
| 2007/0017658 A1 | 1/2007 | Lehman et al. | |
| 2008/0198880 A1 | 8/2008 | Munroe et al. | |
| 2009/0001185 A1 | 1/2009 | Kroll et al. | |
| 2009/0060444 A1 * | 3/2009 | Muendel | G02B 6/3636 385/137 |
| 2009/0222981 A1 | 9/2009 | Hartman | |
| 2009/0266105 A1 | 10/2009 | Viklund et al. | |
| 2009/0306831 A1 | 12/2009 | Guggenmos et al. | |
| 2010/0074586 A1 | 3/2010 | Panarello et al. | |
| 2010/0155040 A1 | 6/2010 | Hoffmann et al. | |
| 2010/0247055 A1 | 9/2010 | Arashitani et al. | |
| 2010/0282442 A1 | 11/2010 | Sukuvoy | |
| 2011/0168794 A1 | 7/2011 | Lee et al. | |
| 2012/0103580 A1 | 5/2012 | Buttignol | |
| 2012/0125573 A1 | 5/2012 | Rubenstein et al. | |
| 2012/0268227 A1 | 10/2012 | Howes et al. | |
| 2012/0301097 A1 | 11/2012 | Nakano et al. | |
| 2012/0318480 A1 | 12/2012 | Lin et al. | |
| 2012/0320589 A1 | 12/2012 | Wang | |
| 2013/0291564 A1 | 11/2013 | Ghoshal et al. | |
| 2014/0230155 A1 | 8/2014 | Schalansky | |
| 2014/0240818 A1 | 8/2014 | Taya | |
| 2014/0246174 A1 | 9/2014 | Arvelo et al. | |
| 2014/0248515 A1 | 9/2014 | Wayne | |
| 2014/0362876 A1 | 12/2014 | Schwarzenbach et al. | |
| 2015/0114612 A1 | 4/2015 | Yang | |
| 2015/0114617 A1 | 4/2015 | Yang | |
| 2015/0159884 A1 | 6/2015 | Whang | |
| 2015/0237767 A1 | 8/2015 | Shedd et al. | |
| 2015/0372451 A1 | 12/2015 | Fulkerson et al. | |
| 2016/0003553 A1 | 1/2016 | Campbell | |
| 2016/0128240 A1 | 5/2016 | Park | |
| 2016/0273853 A1 | 9/2016 | Schuster | |
| 2017/0082382 A1 | 3/2017 | Mastinu et al. | |
| 2017/0149203 A1 * | 5/2017 | Foley | H01S 5/06825 |
| 2017/0170622 A1 * | 6/2017 | Kashiwagi | G02B 6/02 |
| 2017/0329092 A1 * | 11/2017 | Sanders | G02B 6/3814 |
| 2018/0042137 A1 | 2/2018 | Reeves et al. | |
| 2018/0058777 A1 | 3/2018 | Anderson et al. | |
| 2018/0062347 A1 * | 3/2018 | Hodges | F28F 1/22 |
| 2018/0063992 A1 | 3/2018 | Wan et al. | |
| 2018/0172358 A1 | 6/2018 | Moscatelli et al. | |
| 2018/0175577 A1 * | 6/2018 | Hodges | H01S 3/0405 |
| 2018/0340744 A1 | 11/2018 | Tsai et al. | |
| 2019/0099287 A1 | 4/2019 | Vergara | |
| 2019/0226769 A1 | 7/2019 | Kao et al. | |
| 2019/0239493 A1 | 8/2019 | Liu | |
| 2020/0033043 A1 | 1/2020 | Knatt | |

FOREIGN PATENT DOCUMENTS

| | | |
|---|---|---|
| DE | 102012216823 A1 | 3/2014 |
| DE | 102014200989 A1 | 7/2015 |
| EP | 1835234 A2 | 9/2007 |
| FR | 3011131 A1 | 3/2015 |
| JP | 9145072 A | 6/1997 |
| JP | 200590794 A | 4/2005 |
| JP | 2010186970 A | 8/2010 |
| KR | 101168891 B1 | 8/2012 |
| WO | 2016129447 A1 | 8/2016 |
| WO | 2017087865 A1 | 5/2017 |
| WO | 2017197362 A1 | 11/2017 |
| WO | 2018044813 A1 | 3/2018 |
| WO | 2018112220 A1 | 6/2018 |

OTHER PUBLICATIONS

Supplementary European Search Report; EP App No. EP17847319; dated Mar. 31, 2020; 11 pages.

* cited by examiner

FIBER LASER HAVING VARIABLY WOUND OPTICAL FIBER

RELATED APPLICATIONS

This application is a non-provisional of and claims priority benefit to U.S. Provisional Application No. 62/641,903, filed Mar. 12, 2018, which is incorporated by reference herein in its entirety.

TECHNICAL FIELD

The present disclosure relates to fiber lasers, and more particularly to a fiber laser having a variably wound optical fiber.

BACKGROUND

Fiber lasers are widely used in industrial processes (e.g., cutting, welding, cladding, heat treatment, etc.), and there is a trend toward increasing power. In a fiber laser, the optical gain medium consists of one or more optical fibers whose cores are doped with a rare-earth element. The rare-earth element is optically excited ("pumped") with light from one or more semiconductor laser sources. A key challenge in continued development and power scaling of fiber lasers is thermal management of the gain fiber, which generates heat follow the absorption of pump light. Excessive heating of the gain fiber can cause undesirable changes in the performance characteristics of the laser (e.g., spectral characteristics, efficiency). More significantly, excessive heating can cause damage or failure of the polymer materials used to coat and possibly pot the gain fiber, as well as other fibers and nearby components. The polymers used to coat and pot the fibers typically have maximum temperature ratings between 80 and 200 C, so the heat generated by the fiber laser must be removed while maintaining the polymer temperature below the maximum limit.

The length of the gain fiber is typically between 1 and 100 m, although other values are possible. In most fiber lasers, the gain fiber (and other fibers) are coiled or spooled for packaging and thermal management. The fiber may be coiled into a flat spiral shape, or it may be spooled on the outside or inside of a cylindrical mandrel. The mechanical structure may include grooves or other features for routing and containing the fiber, and the fiber may be potted onto or into the shapes.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

DETAILED DESCRIPTION

Figure 1:
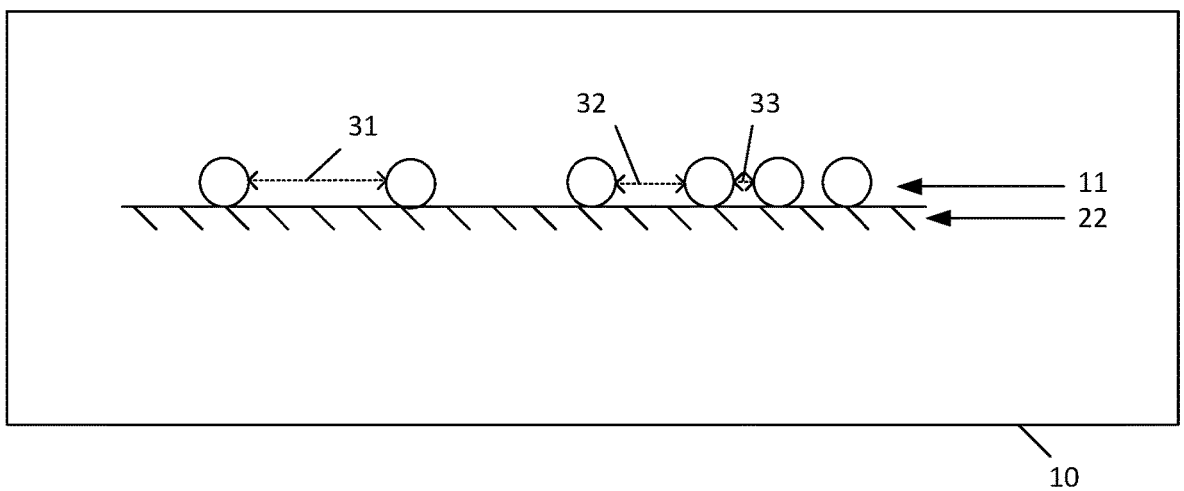
FIG. 1 illustrates a cross-sectional view of a variably wound optical fiber mounted on a surface of a heat conductor of packaging of a fiber laser, according to some embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another.

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Some fibers (e.g., a gain fiber) may generate a significant amount of heat (e.g., high power density), and this heat must be sufficiently dissipated based on (e.g., based at least in part on or based exclusively on) maximum thermal requirements. Certain polymer coatings may include a requirement for a maximum operating temperature of 120 degrees Celsius in worst case conditions, for example. While known packaging may dissipate sufficient heat, there may be a need to make a more compact packaging and/or to scale the power of the fiber laser (e.g., from 3 kW to 5 kW, for example).

In some known systems in which the optical fiber is coiled or spooled, the fiber spacing is uniform between adjacent passes (e.g., as in an Archimedean spiral for an optical fiber wound into a spiral). The heat deposition rate (W/m) in a fiber laser is not, however, typically uniform along the length of the fiber. The heat deposition rate is highest in portions of the fiber that have the largest rate of pump absorption (W/m or dB/m). The heat deposition rate is determined by several factors, including the pump power, the pump wavelength or spectrum, the rare-earth doping level in the fiber, and the fiber core and cladding sizes.

In a fiber with uniformly spaced fiber routing, the temperature will not be uniform: The regions with the highest heat deposition rate will be the hottest and will ultimately limit the maximum power. For a given heat deposition rate, the maximum temperature can be reduced by increasing the spacing between adjacent passes of the fiber, but this approach can significantly increase the size of the packaging.

Some embodiments may include packaging compatible with significant heat generation and/or requirements for packaging that has a compact design. The packaging may include a heat conductor with a first side on which a variably wound fiber laser may be mounted. In some embodiments, a guide may be formed on or in a surface of the first side of the heat conductor, and this guide may be referred to as a varied pitch optical fiber guide. In other examples, a potting material may be deposited on the first side of the heat conductor to which the optical fiber may be adhered to. In some embodiments, a cooling system may be mounted to a second side of the heat conductor or integrated into the heat conductor.

In embodiments including a varied pitch optical fiber guide, the varied pitch optical fiber guide may include a channel to receive the wound fiber, such as a groove machined into a surface, such as a planar surface of a plate or a non-planar surface such as an outer or inner surface of a cylinder. Thick walls may define one length of the channel. These thick walls may be configured to conduct heat from the length of the fiber associated with the greatest heat generation (the thick walls may transfer heat through the heat conductor to be dissipated on the other side of the heat conductor, e.g., by a cooling system coupled to the other side of the heat conductor). A remainder of the channel may be defined by different walls that are not as thick as the thick walls. Although these different walls may not be configured to conduct as much heat as the thicker walls, they may conduct sufficient heat to avoid reaching the maximum temperature requirement in worst operating conditions (e.g., may conduct heat adequately for the remaining length of the fiber).

The different walls may include a transition section where they have variable thickness from one end of the transition section to the other end of the transition section. In some embodiments, the transition section of the channel may have a shape that is different than a shape of a turning of an arithmetic spiral (the shape of an arithmetic spiral typically includes successively larger turnings). The transition section may have any shape in which the walls may have a variable thickness through the transition section, e.g., a shape of a non-arithmetic spiral turning (such as a 40 degree arc or other arc having one end a first distance from center and progressively moving further away from the center to a second end that is a greater distance from the center). The transition section may have a shape of a partial logarithmic spiral turning, in some examples.

A length of the transition section may be selected based on characteristic of the fiber, such as a specified bend radius (e.g., a minimum bend radius), to provide a compact size of the planar heat conductor. In some embodiments, the transition section may as short as possible to avoid bending the fiber greater than the specified bend radius to provide a compact design. In some embodiments the transition section may be a 40 degree arc depending on characteristics of the fiber. In other examples, the transition section may be longer than the minimum length related to the characteristic of the fiber such, e.g., a 180 degree arc or a 360 degree arc.

The different walls may include an additional section (e.g., a uniform thickness section) after the transition section. In some embodiments, a thickness of the walls in this additional section may be selected to be as thin as possible to conduct heat from the corresponding length of the fiber to avoid exceeding the same maximum operating temperature in worst possible conditions.

In some embodiments, a heat conductor having channels may include more than one transition section and three or more non-transition sections. Each of the non-transition sections may include uniform thickness walls, but at least one of the non-transition sections may have thicker walls than other one(s) of the non-transition sections.

In other embodiments without channels/walls, a uniform width material may be provided between the loops of the fiber for the length of the fiber associated with the greatest heat generation. The uniform width material may include potting material, a section of a ribbon that is co-wound with the optical fiber, etc., and may be arranged to conduct heat generated by the loops of the fiber for the length of the fiber associated with the greatest heat generation, and provide a path for that heat to the surface on which the optical fiber is mounted. A remaining length of the fiber may be arranged in one or more transition sections (with non-uniform width material), and one or more additional non-transition sections (with uniformed width material thinner than the uniform width material of the length of the fiber associated with the greatest heat generation).

FIG. 1 illustrates a cross-sectional view of a variably wound optical fiber 11 mounted on a surface 22 (which may be planar or non-planar, e.g., curved) of a heat conductor of packaging of a fiber laser 10, according to some embodiments. The variably wound optical fiber 11 may include a first length with a first separation distance 31 between loops of the first length and a second different length with one or more second smaller separation distances 32 and 33 between loops of the second length. The second length of the fiber laser 10 may be associated with second heat generation (e.g., lower heat generation) during operation of the fiber laser. In one example, the first length may include a first section of a gain fiber and the second length may include a second different section of the gain fiber and/or a passive fiber.

The surface 22 may include one or more heat conductive materials, such as a potting material deposited on metal. A shape of the surface 22 may be planar or substantially planar (e.g., a surface of a plate with or without potting material deposited thereon) or non-planar (e.g., a curved surface such as an inside or outside surface of a cylinder).

Figure 7:
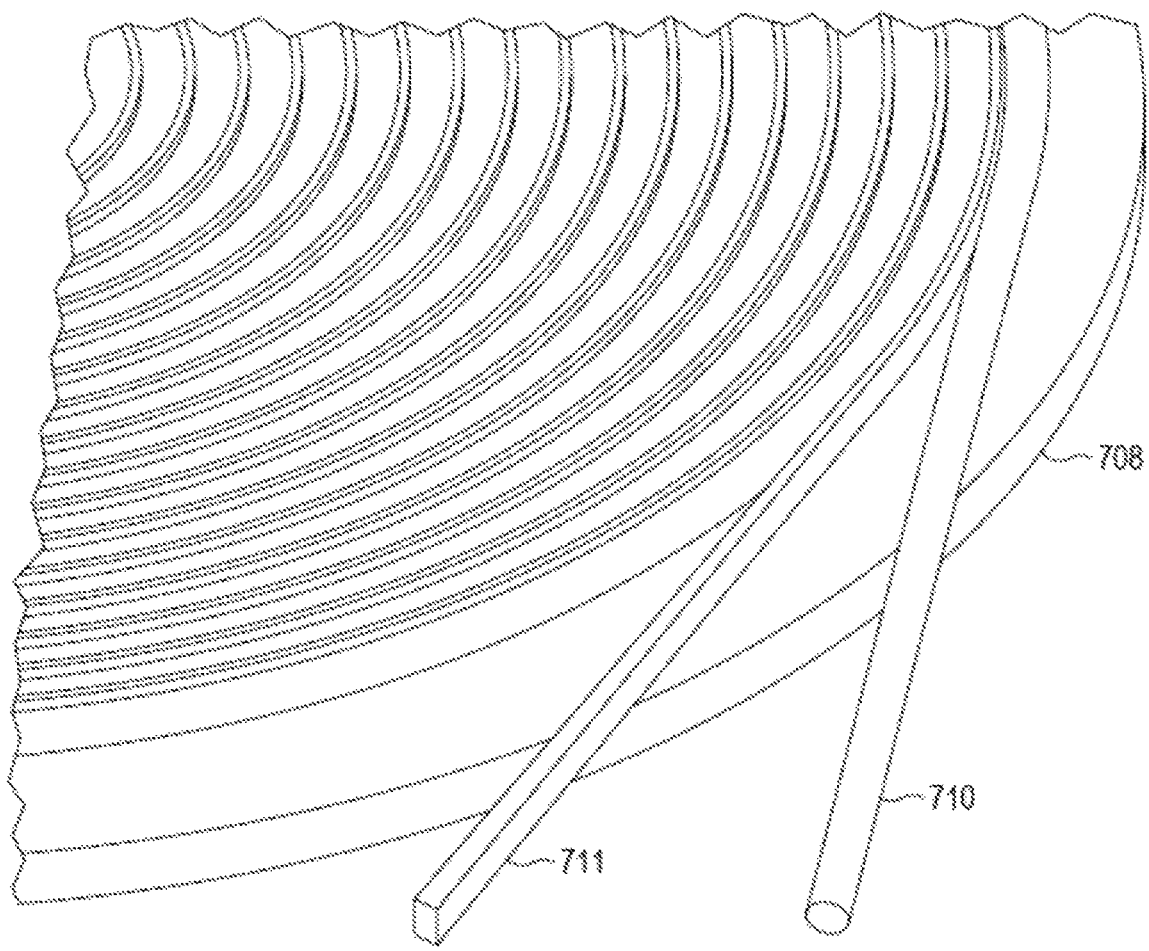
FIG. 7 illustrates an isometric view of a variable thickness metal ribbon co-wound with an optical fiber, according to some embodiments.

In embodiments using a varied pitch optical fiber guide on or in the surface 22 (not shown), the varied pitch optical fiber guide may include features to space the optical fiber 11. The features may be walls defining channels in some embodiments, although this is not required. U.S. patent application Ser. No. 15/842,441 entitled FIBER LASER PACKAGING, which is herein incorporated by reference in its entirety, describes co-winding a fiber with a ribbon. In some embodiments of packaging including a varied pitch optical fiber guide, the features may include a ribbon may have more than one length (for instance a thick ribbon may be spliced to a thin ribbon). The thick ribbon may be co-wound with the first length of the fiber. The thin ribbon and the splice (e.g., a transition region) may be co-wound with a second length of the fiber (where the second length may have an operating power density that is less than an operating power density of the first length). FIG. 7 illustrates an isometric view of a variable thickness metal ribbon 711 co-wound with an optical fiber 710, and mounted on a heat conductor 708, according to some embodiments.

Referring again to FIG. 1, in some embodiments a variable pitch optical fiber guide (not shown) and/or its features (not shown) may include third dimensional structures. The third dimensional structures may be fabricated (e.g., printed) on the surface 22 of the heat conductor. In some examples, the heat conductor, the variable pitch optical fiber guide, and/or the features may be fabricated in a same set of one or more processes. In other examples, the variable pitch optical fiber guide and/or its features may include components attached (e.g., fastened) to the surface 22 of the heat conductor.

Some of the features may include a material having a first thermal characteristic may be used for some of the features that is different second thermal characteristic of a material of the other features. For instance, referring again to the ribbon example, a ribbon of one thickness and including one material (e.g., thick copper ribbon) may be spliced to a ribbon of a different thickness and not including the same material (e.g., including a different material such as aluminum to provide heat transfer for the passive section of the fiber).

The features may place one length of the fiber closer to a cooling plate than another length of the fiber. In examples in which the features include channels it may be possible and practical to provide a channel may have a variable depth to place the first length of the fiber closer to a cooling system (not shown) on the other side of the heat conductor than a side of the surface 22 (e.g., on an opposite side). Also, it may be possible and practical to vary a width of the channel for various reasons including but not limited to a wider region to correspond to the second length if the second length includes a thicker splice section (the first length may be closer to the thick walls in the thinner width portion of the channel).

Figure 2:
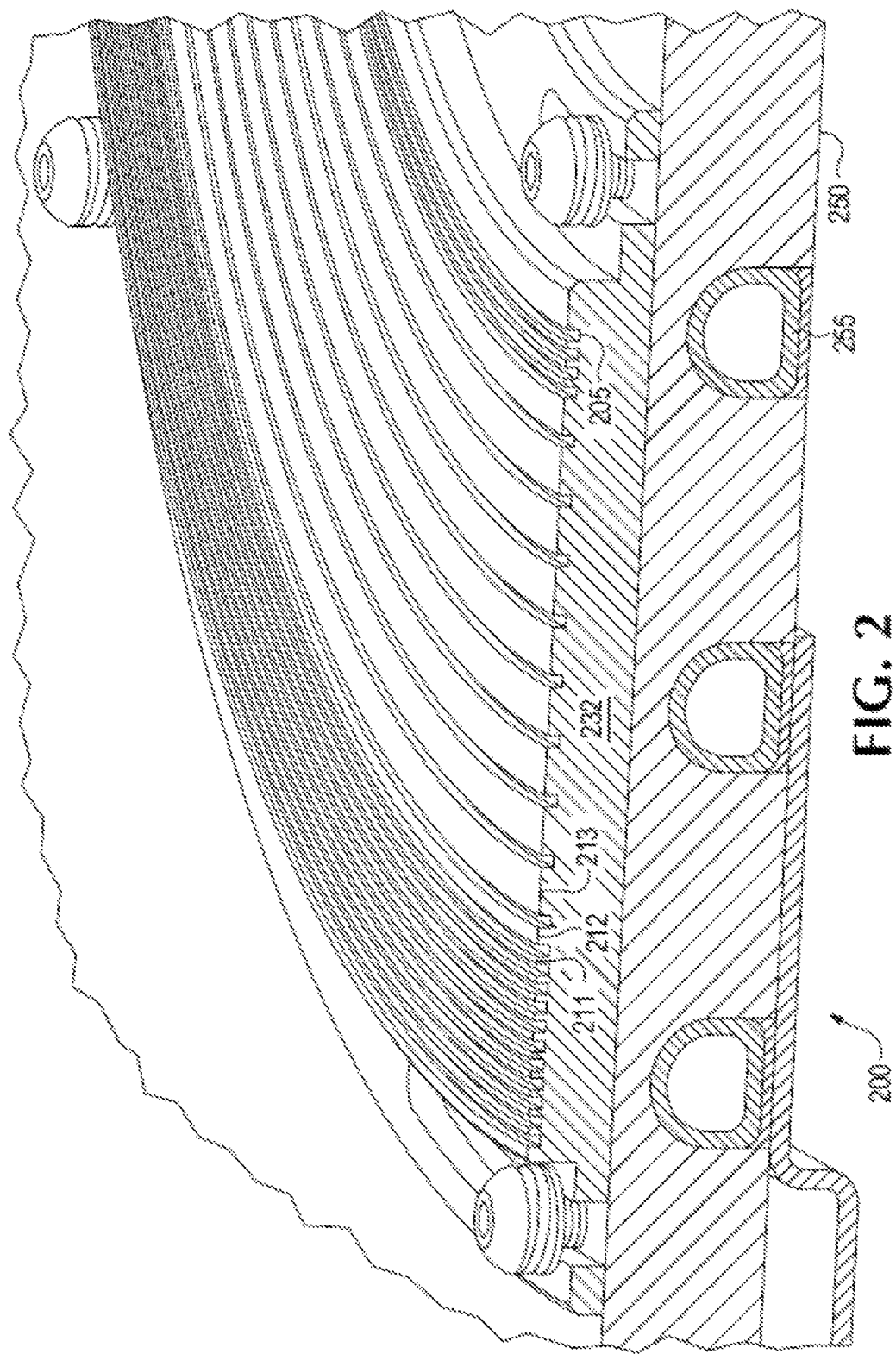
FIG. 2 illustrates a cross-sectional isometric view of a packaging for a fiber laser including a variably wound optical fiber, according to some embodiments.

FIG. 2 illustrates a cross-sectional isometric view of a packaging 200 for a fiber laser including a variably wound optical fiber, according to some embodiments. In this embodiment, the packaging 200 may include a cooling system (e.g., a liquid cooled cold plate 250 with tubing 255 or other heat exchanger) coupled to a first side of heat conductor 232. The second side of the heat conductor 232 may include a channel 205. The channel 205 may include a uniform width from a first end of the channel 205 corresponding to an innermost loop of the channel 205 to a second end of the channel 205 corresponding to an outmost loop of the channel 205.

Although a width of the channel 205 may be uniform, the thickness of walls of the channel 205 may vary. For instance, some walls, e.g., wall 213, may be different thickness than other walls, e.g., walls 211 and 212.

In the illustrated example, the wall 213 may be a same thickness as the next seven walls toward the innermost wall, and these walls together with the wall 213 may define the portion of the channel 205 to receive a first length of a wound fiber (not shown) having the first length with a first operating power density that is greater than an operating power density of a second length of the fiber. The first operating power density may be associated with nearest neighbor heating in some coils/spools. Nearest neighbor heating may be caused by heat traveling away from a fiber in various different directions. The heat of one loop of the fiber may build up with heat from another loop of the fiber in a coil or spool. Too much nearest neighbor heating may cause a heat buildup that could lead to poor performance and/or heat damage in the worst operating conditions. Due to the thick wall 213, heat may radiate in different directions from a fiber in the channel having the thick wall 213 down to a corresponding portion of the tubing 255 (where it may be removed using by the laser's cooling system, e.g., by water or some other liquid to travel through tubing 255).

In the illustrated example, the wall 212 for a transition may have a thickness in between the thickness of the wall 211 and the wall 213. The wall 212 may corresponding to a partial loop of the channel 205, e.g., less than 360 degrees. The thinner wall 211 may be a same thickness as the next nine walls towards the innermost wall, and these walls together with the wall 212 may define the portion of the channel 205 to receive the second length of the fiber. The second length of the fiber, having a lower operating power density, may generate less heat, and nearest neighbor heating may not result in too much heat buildup.

Based on a different thickness walls 211, 212, and 213, a packaging may adequately remove heat from a 5 kW or more Master Oscillator Power Amplifier (MOPA) having a thermal requirement of less than 120 degrees Celsius in worst operating conditions, in some embodiments. The packaging 200 also may have a compact size due to the thinner walls 211 and 212, in some embodiments.

In the illustrated example, the fiber (not shown) may include a third length having an operating power density less than the first length (in this example, the first length bisects the second and third lengths). The operating power density of the third length may be the same or different than the operating power density of the second length. The innermost portion of the channel 205 may be defined by walls 212 that are thinner than the wall 213.

In some examples, the channel 205 may be formed by machining a groove into heat conductor 232. The machining tool may be operated to selectively switch between an arithmetic spiral path (to produce a constant separation distance between successive loops) and a non-arithmetic spiral path one or more times during machining (to produce a wall 212 that has a different thickness along the loop, e.g., a thickness with a uniform rate of change). For example, in the illustrated example from inside to outside, the machine may follow an arithmetic spiral (for a portion of the third length of the fiber), a non-arithmetic spiral for transition section of the varied pitch guide, an arithmetic spiral (for a portion of the first length of the fiber), an additional non-arithmetic spiral for the next transition section, and an arithmetic spiral (for a portion of the second length of the fiber). The machine may use more than one spiral size setting for machining (e.g., more than one arithmetic spiral size setting selectively utilized for different portions of the groove).

In this embodiment, as mentioned previously, a cooling system including a liquid cooling plate 250 is coupled to the opposite side of the heat conductor 232. However, in other embodiments, a cooling system may include a air-cooled assembly, 2-phase cooling, or the like, or combinations thereof, coupled to (or integrated with) the heat conductor 232.

Figure 3:
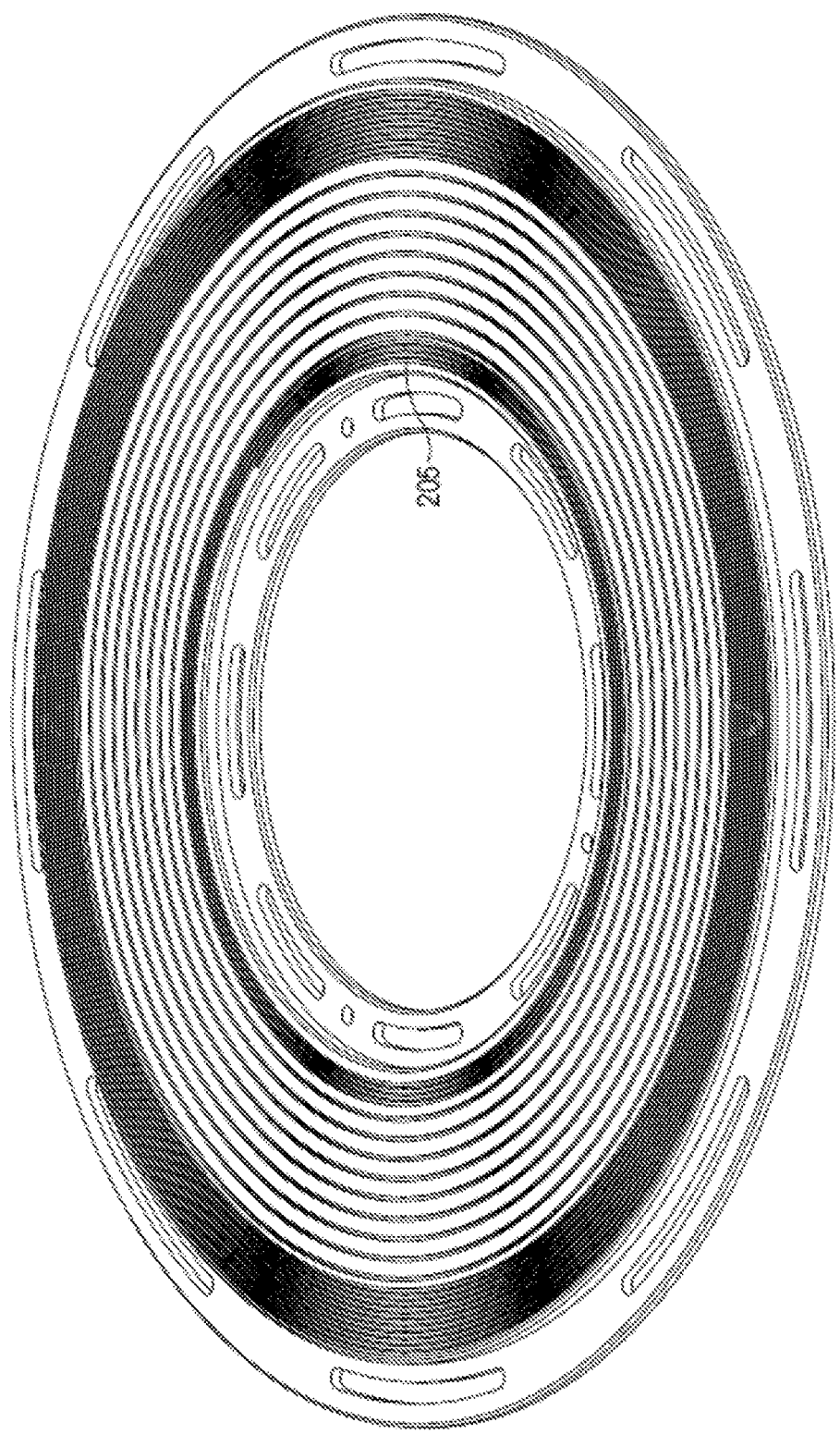
FIG. 3 illustrates an isometric view of an annular plate of FIG. 2, according to some embodiments.
Figure 4:
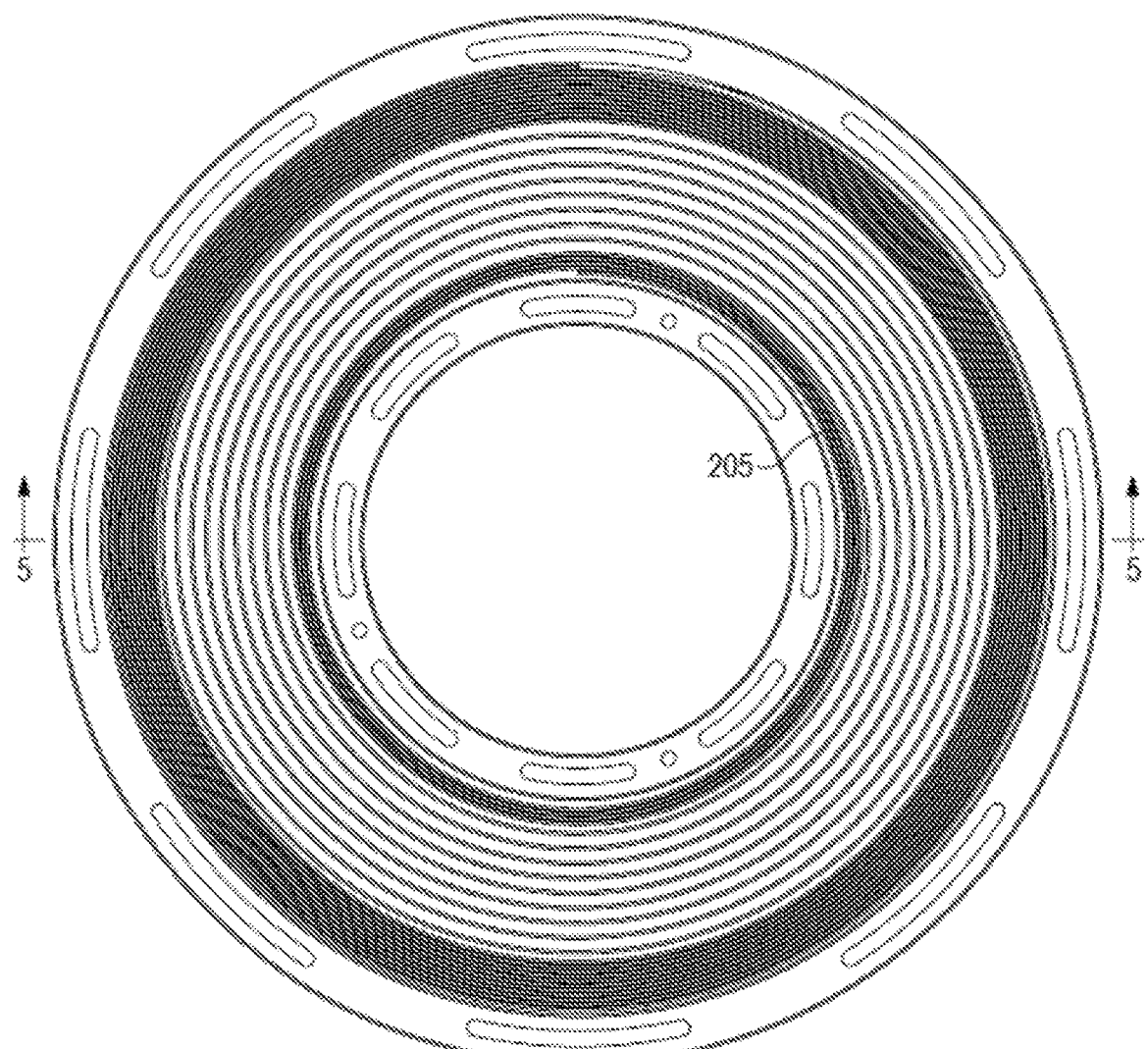
FIG. 4 illustrates a top view of the annular plate of FIG. 2, according to some embodiments.
Figure 5:
FIG. 5 illustrates a cross-section side view of the annular plate of FIG. 2, according to some embodiments.

FIGS. 3, 4, and 5 illustrate an isometric view, a top view, and a size view (respectively) of the heat conductor 232 of FIG. 2. Referring to FIG. 5, the side of the heat conductor 232 having the channel 205 may include a raised planar surface on another planar surface. The channel 205 may be formed on the raised planar surface.

Figure 8:
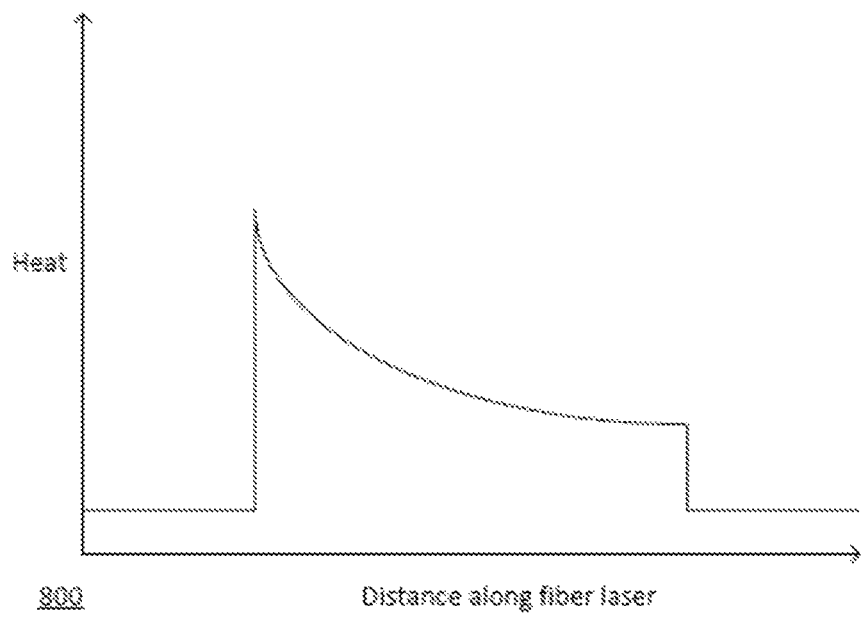
FIG. 8 illustrates heat graphed to distance along an optical fiber for different fiber configurations the fiber laser of FIG. 1, according to some embodiments.
Figure 8:
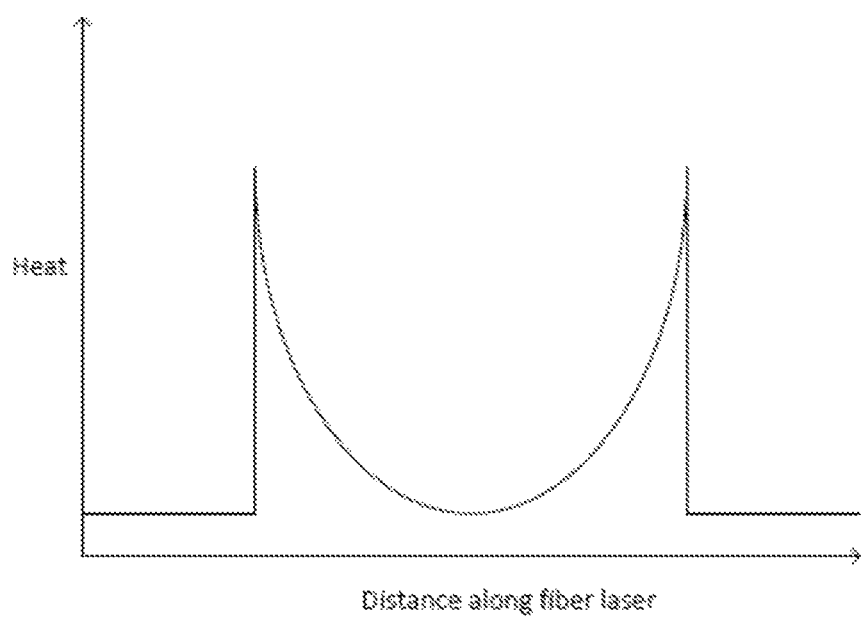

FIG. 8 illustrates heat graphed to distance along an optical fiber for different fiber configurations of the fiber laser 10 of FIG. 1, according to some embodiments. Graph 800 illustrates heat graphed to distance for a fiber having a first length including an oscillator between second and third lengths for passive sections of the fiber. The first length including the oscillator generates more heat, and may be placed in a section of a guide having a greater separation distance. Graph 850 illustrates heat graphed to distance for a fiber pumped on both sides.

Figure 10:
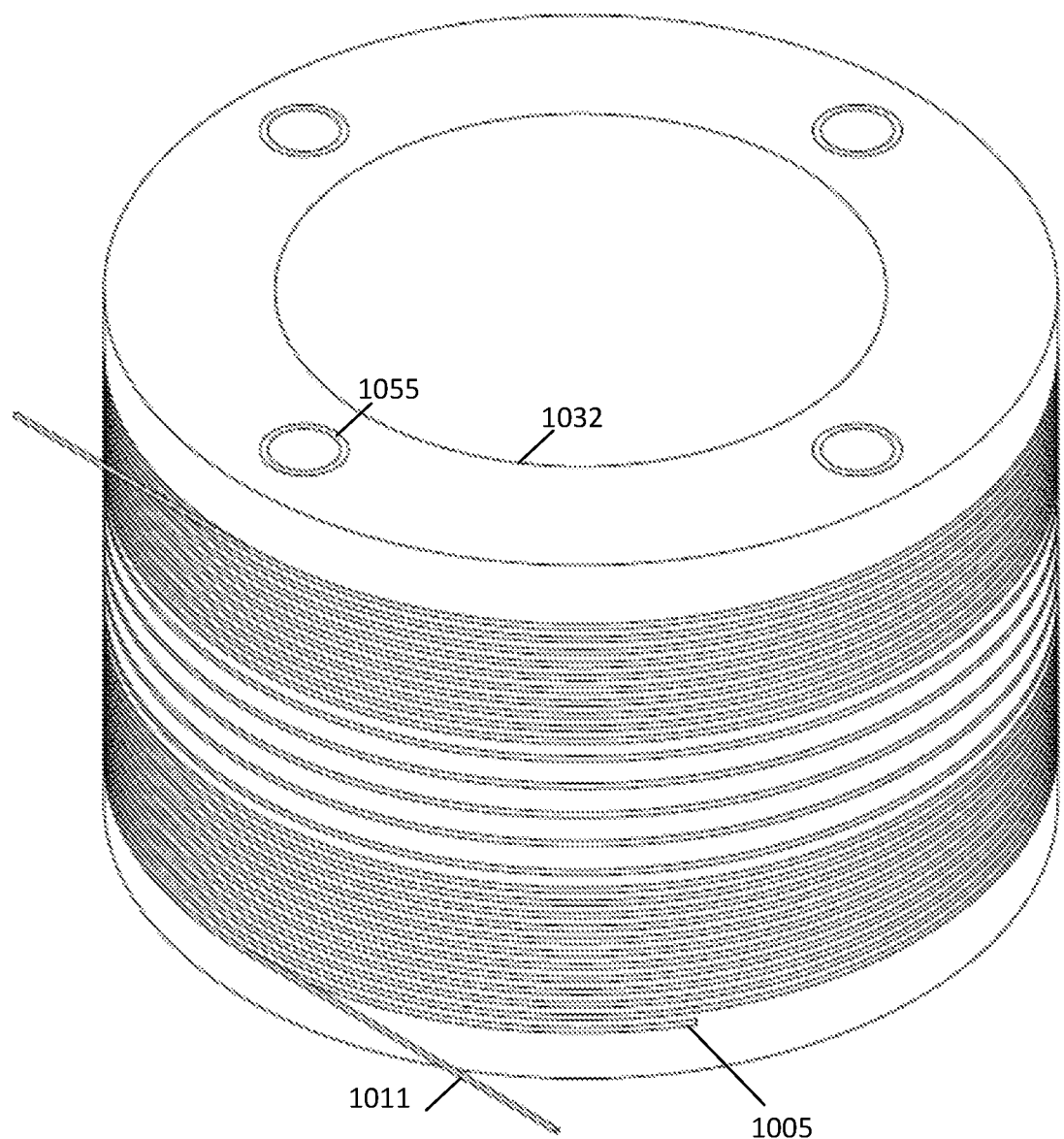
FIG. 10 illustrates an isometric view of an optical fiber variably wound around an outer surface of a cylindrically shaped heat conductor having an integrated cooling system, according to some embodiments.

FIG. 10 illustrates an isometric view of an optical fiber 1011 variably wound around an outer surface of a cylindrically shaped heat conductor 1032 having an integrated cooling system 1055 (e.g., liquid cooling pipes or the like), according to some embodiments. In contrast to embodiments in which a variably wound optical fiber is mounted on a first side of a heat conductor having a second side with a cooling system mounted thereto, the cylindrically shaped heat conductor 1032 has an integrated cooling system 1055 to remove heat generated by the optical fiber 1011. In the illustrated example, the surface on which the optical fiber 1011 is mounted includes a channel 1005, although this is not required. In other examples, an adhesive material may be deposited on the surface to mount the optical fiber 1011.

Figure 11:
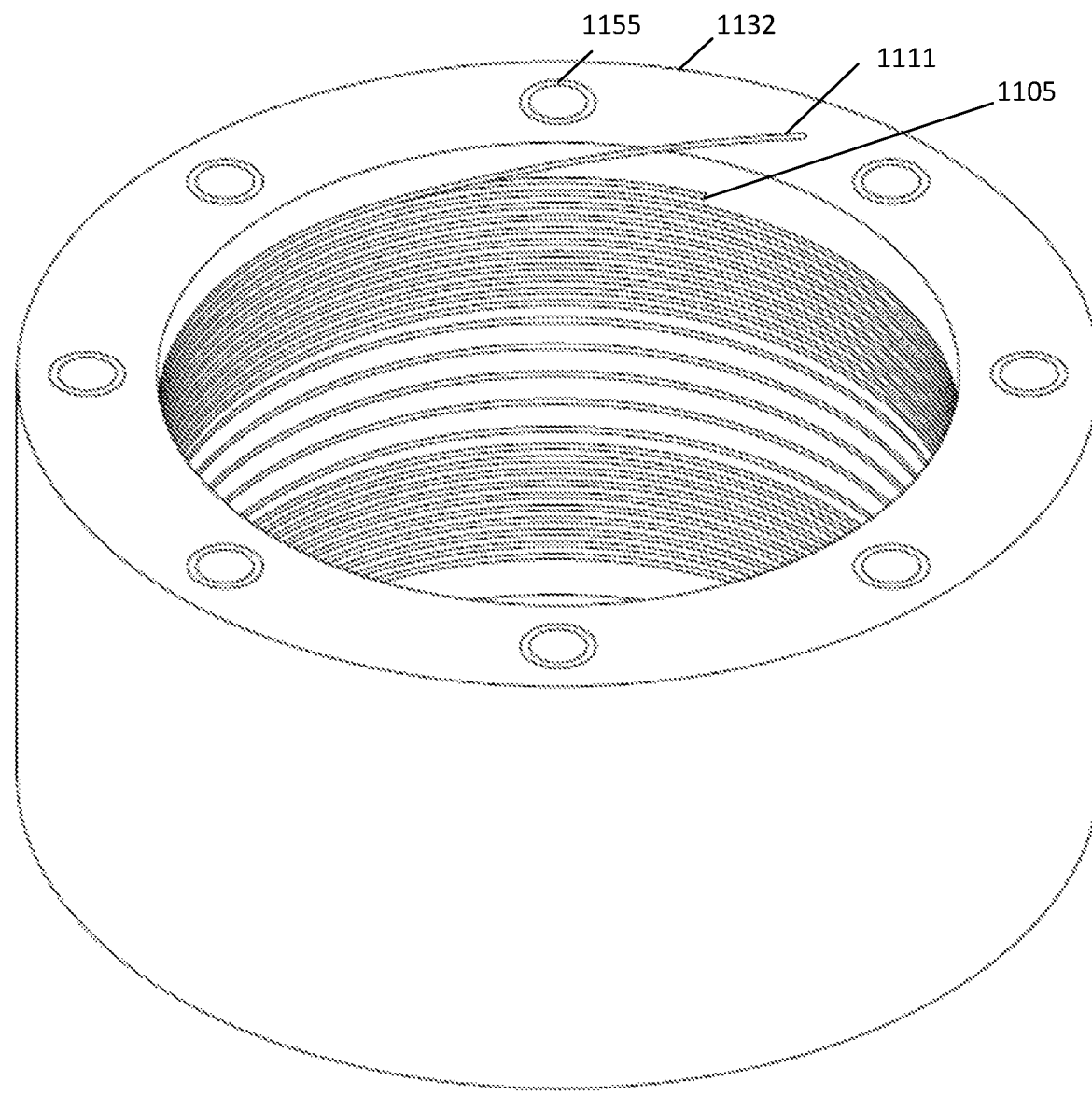
FIG. 11 illustrates an isometric view of an optical fiber variably wound around an inner surface of a cylindrically shaped heat conductor having an integrated cooling system, according to some embodiments.

FIG. 11 illustrates an isometric view of an optical fiber 1111 variably wound around an inner surface of a cylindrically shaped heat conductor 1132 that includes an integrated cooling system 1155, according to some embodiments. In the illustrated example, the surface on which the optical fiber 1111 is mounted includes a channel 1105, although this is not required. In other examples, an adhesive material may be deposited on the surface to mount the optical fiber 1111.

Figure 12:
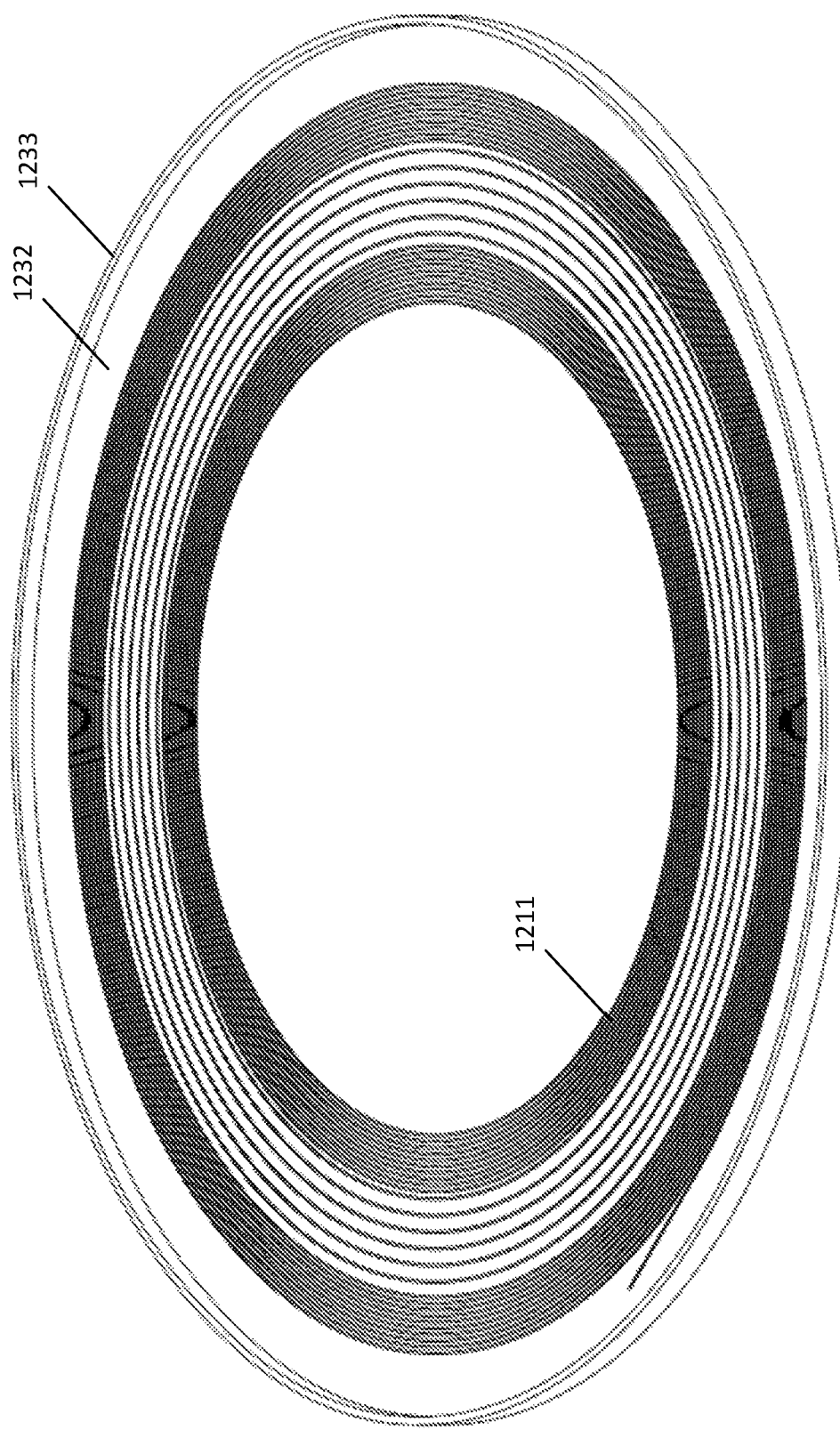
FIG. 12 illustrates an isometric view of a variably wound optical fiber mounted on a heat conductor having a lip, according to some embodiments.

FIG. 12 illustrates an isometric view of a variably wound optical fiber 1211 mounted on a heat conductor 1232 having a lip 1233, according to some embodiments. In this example, the heat conductor 1232 does not include a channel. Rather, the heat conductor 1232 may have an adhesive material (not shown) deposited thereon for mounting the optical fiber 1211.

Figure 13:
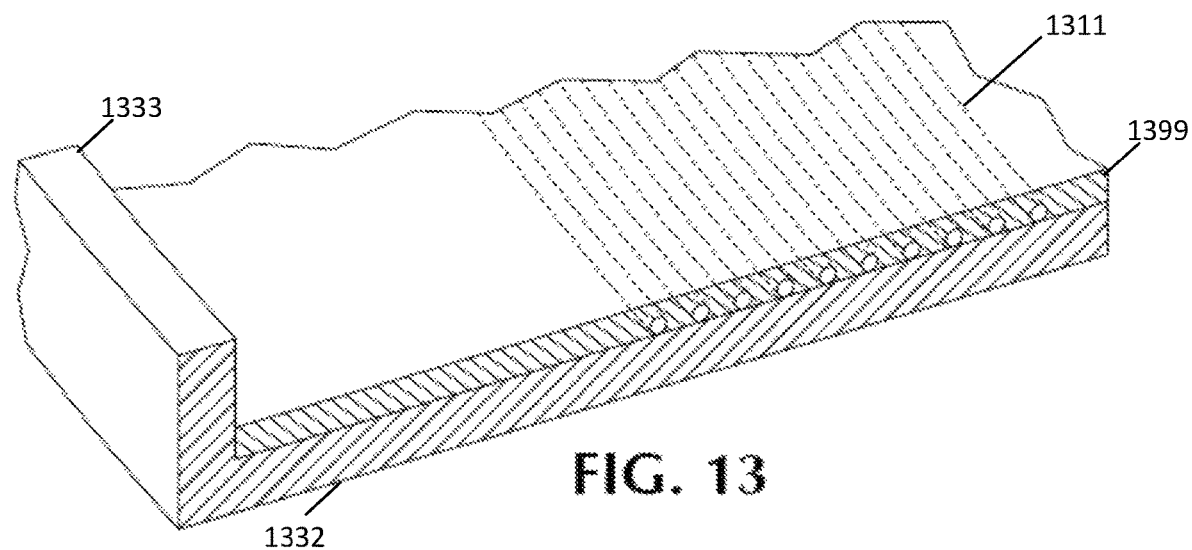
FIG. 13 illustrates a cross sectional view of a variably wound optical fiber mounted on a heat conductor having a lip, in which a potting material layer is deposited on the variably wound optical fiber, according to some embodiments.

FIG. 13 illustrates a cross sectional view of a variably wound optical fiber 1311 (only a portion of this optical fiber is illustrated for brevity) mounted on a heat conductor 1332 having a lip 1333, in which a potting material layer 1399 is deposited on the variably wound optical fiber 1311, according to some embodiments. The potting material layer 1399 may be used instead of, or in combination with, an adhesive layer (not shown) between the variably wound optical fiber 1311 and the heat conductor 1332. The potting material layer 1399 may be the same or different material than any adhesive layer. The potting material layer 1399 may be used to fix a position of the variably wound optical fiber 1311. In some examples, the potting material layer 1399 may include a layer of thermal compound, which may transfer heat generated by the optical fiber 1311 into the heat conductor to be dissipated by a cooling system and/or another side of the heat conductor.

The lip 1333 and the mounting surface of the heat conductor 1332 may define a space in which the potting material layer 1399 may be deposited. In another embodiment, a heat conductor 1332 may have a shape of an annular ring and another lip may be included at the edge defining the opening of the annular ring.

Figure 6:
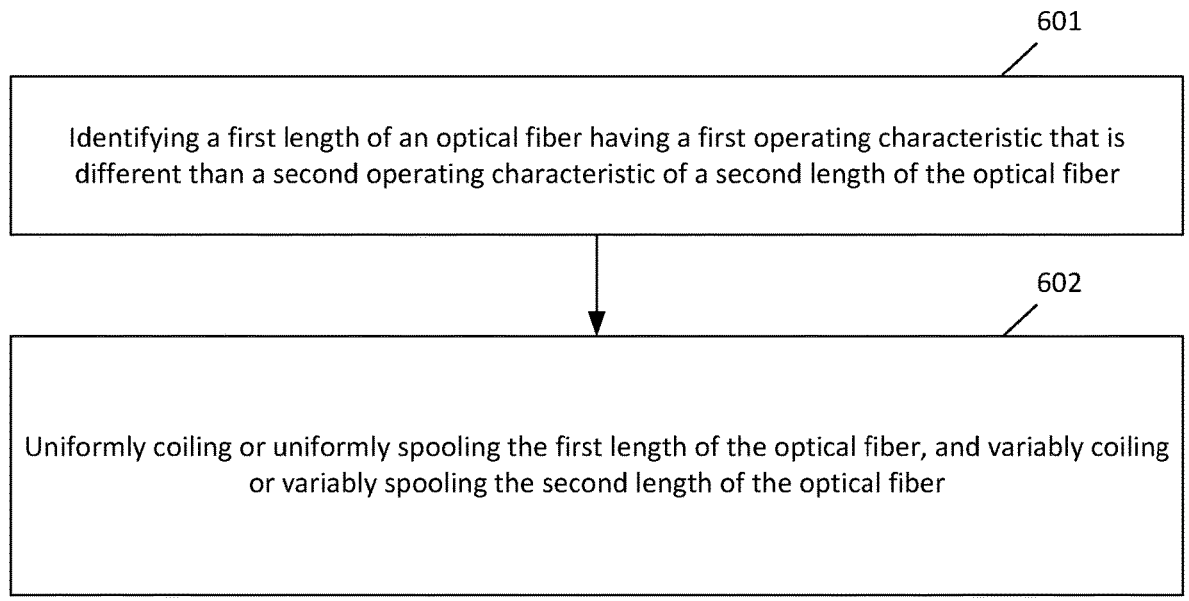
FIG. 6 illustrates a process of variably coiling or variably spooling an optical fiber, according to some embodiments.

FIG. 6 illustrates a process 600 of variably coiling or variably spooling an optical fiber, according to some embodiments. Block 601 includes identifying a first length of an optical fiber having a first operating characteristic (e.g., operating power density, heat generation density, etc.) than a second operating characteristic of a second length of the fiber. The different lengths may be identified based on modeling heat graphs, a design of the fiber (e.g., the first length may be a length for an amplification function), by measuring a prototype in operation, and/or by modeling heat dissipation.

Block 602 includes uniformly coiling or uniformly spooling the first length of the optical fiber, and variably coiling or variably spooling the second length of the optical fiber. The first length of the variably wound fiber laser may include first loops with a first constant separation distance between successive ones of the first loops. The second length of the variably wound fiber laser may be arranged into second loops with a second different constant separation distance (e.g., smaller) between successive ones of the second loops, and at least a third partial loop. A separation distance between the third at least partial loop and one of the first loops and/or one of the second loops may be non-constant (e.g., variable with a constant rate of change).

In some examples, block 602 may include identifying a length of the third at least partial third loop based on a characteristic of the fiber that is based on a degree of curvature of the fiber. For example, a length of the third at least partial loop may be selected based on a specified bend radius. In some examples, to optimize the packaging compactness, the length of the third at least partial loop may be selected to exploit the specified bend radius of the fiber. In some examples, a factor of safety may be utilized as well. In some examples, a minimum safe diameter in a transition section that includes the third at least partial loop may be greater than or equal to a product of a diameter of the fiber cladding in millimeters, a constant factor of safety (e.g., 250 or 300, in some examples), and the quotient of 100 and a proof test level value (e.g., a pressure and/or tension in, say, kilopound per square inch, which may specify the maximum degree of curvature). In other examples, a length of the third at least partial loop may have a longer length than the length associated with the specified bend radius. For instance, the transition section may be any length associated with a selected rotation, such as 180 or 360 degrees.

Conductive Heat Spreader to Reduce Packaging Dimensions and/or Scale Fiber Laser Power Some fiber laser systems may include an optical fiber having variable heat generation (e.g., variable along a length of the optical fiber), which may be arranged in a coil or spool (e.g., a variably coiled or variably spooled) on a surface of a heat conductor. A convection cooling system below the surface may remove heat from the fiber laser (e.g., a fluid, such as a liquid, may transfer the heat away from the fiber laser).

In these embodiments, the optical fiber may be placed in a channel on the surface and/or a potting material (e.g., thermal compound) may be deposited around at least some portions of at least some of the loops of the coil or spool. A conductive heat spreader may be placed over a portion of the optical fiber in thermal contact with the potting material and/or the top of the "walls" of the channel (e.g., over a portion of a "hottest" loop). The conductive heat spreader may collect heat generated by the hottest loop, and transfer heat generated by that hottest loop to the surface through potting material or the walls of the channel. The inter-loop potting material or walls that provide the path for the heat may include inter-loop potting material or walls around the hottest loop. In examples where the conductive heat spreader is over a plurality of loops, heat generated by a hottest loop may travel laterally through the heat spreader, and then through inter-loop potting material or walls around one or more other loops of the plurality of loops. Heat received at the surface of the heat conductor from the inter-loop potting material or walls may travel below the surface (by conduction) to be removed using convection by the cooling system.

Figure 14:
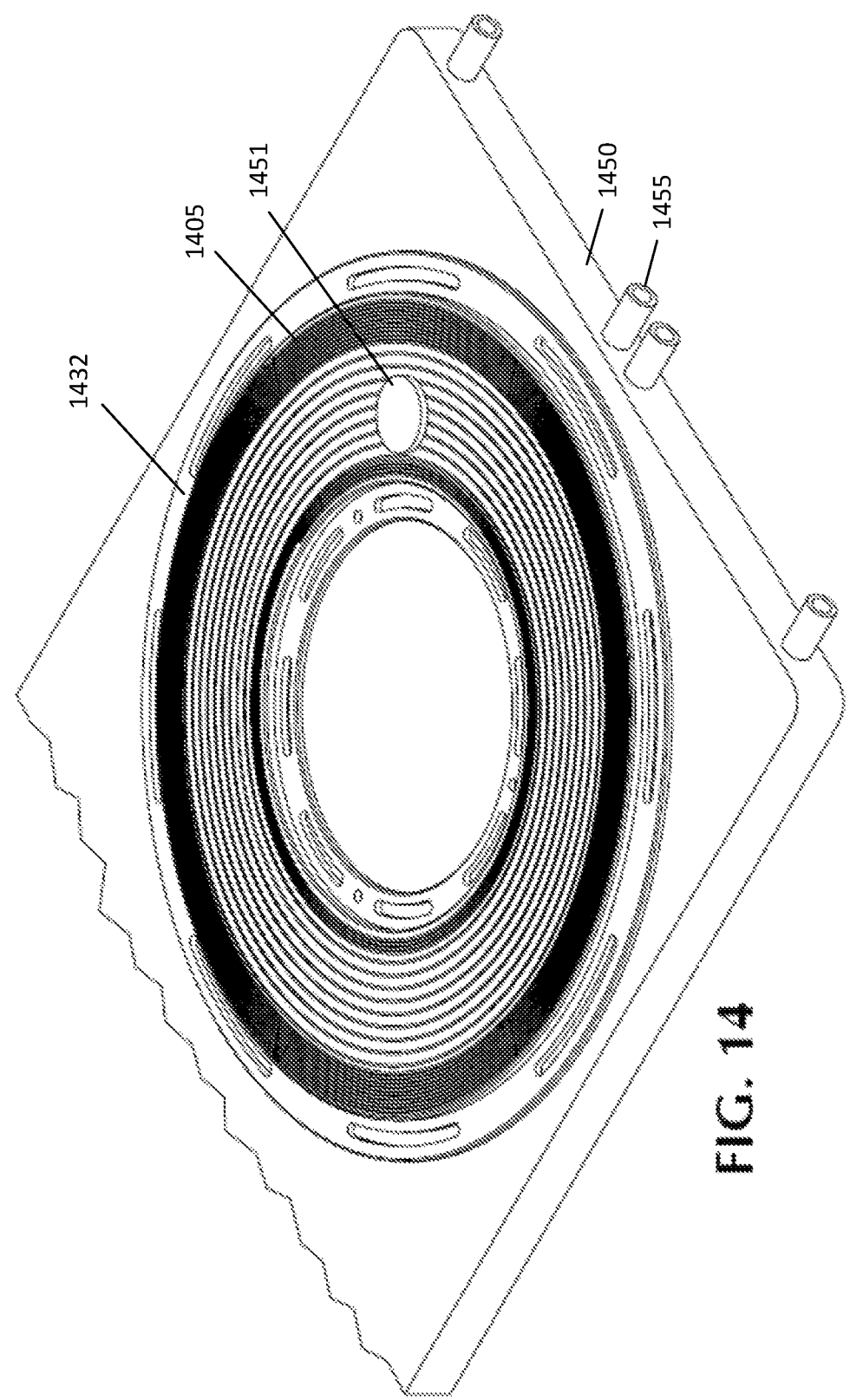
FIG. 14 illustrates a conductive heat spreader having a center arranged over a selected portion of a selected loop of a variably wound optical fiber, according to some embodiments.

FIG. 14 illustrates a conductive heat spreader 1451 having a center arranged over a selected portion of a selected loop of a variably wound optical fiber, according to some embodiments. In one example, the heat conductor 1432, the channel 1405, the cooling system 1450, and the tubing 1455 may be similar (respectively) to any heat conductor, channel, cooling system, and tubing described herein, such as the heat conductor 232, the channel 205, the cooling system 250, and the tubing 255 described with respect to the embodiment of FIGS. 2-5. A hottest region of an optical fiber (not shown) in the channel 1405 may be identified using any operations described herein (e.g., the operations of block 601 of FIG. 6). The hottest region of the optical fiber may include an interface of an active fiber, e.g., an interface to a passive fiber or to a differently doped active fiber, in some examples. A conductive heat spreader 1451 having a center arranged over the identified region of the optical fiber may be mounted to the heat conductor and/or the optical fiber. The conductive heat spreader 1451 may extend a same distance in all directions from the center in some embodiments, e.g., may be disc-shaped as illustrated.

In one example, the conductive heat spreader 1451 may be mounted using a layer of potting compound (not shown) deposited on and/or around the identified region of the optical fiber. In some examples, the conductive heat spreader 1451 may be placed on the potting compound while the potting compound is wet, before it cures (at which time the conductive heat spreader 1451 may be securely mounted).

Heat generated by the identified region of the optical fiber during operation of the fiber laser may move outward from the center of the conductive heat spreader 1451 towards the edges of the conductive heat spreader 1451 (e.g., parallel to a surface of the heat conductor 1432). Following such movement, the heat may travel toward the cooling system 1450 through the wide walls of the channel 1405 (where it may be carried away using a liquid pumped through the tubing 1455). Due to this heat path, the conductive heat spreader 1451 need not rely on convection cooling by air in contact with a surface of the conductive heat spreader 1451. Accordingly, the conductive heat spreader 1451 does not need the accoutrements of convection heat sinks, e.g., fins, airflow, etc., and may be compact (e.g., a plate), lightweight yet still provide significant temperature reduction.

In one example similar to the illustrated example, a 10 degree Celsius reduction in the maximum temperature associated with the optical fiber was observed following the addition of a disc-shaped heat spreader. Such a reduction may allow further scaling of fiber laser power and/or shrinking a dimension of any component of packaging to realize a more compact fiber laser.

The conductive heat spreader 1451 may be utilized in any example described herein. For instance, referring to FIG. 1, the optical fiber includes a first side mounted on the surface 22. The conductive heat spreader 1451 may be mounted on a second opposite side of the optical fiber. The first separation distance 31 may be filled with a thermal compound, which may provide a path for heat down to the surface 22 following lateral movement through the conductive heat spreader 1451. Also, in some examples, the conductive heat spreader 1451 may be used with packaging without the second and third separation distances (e.g., with a same separation distance between each loop of the optical fiber) to, for instance, achieve scaling of fiber laser power.

In some examples, the conductive heat spreader 1451 may include more than one section, e.g., separate non-contiguous sections (not shown). For example, more than one region of the optical fiber may be identified (e.g., more than one highest ranked regions that are each hotter than a threshold) for, say, an optical fiber having more than one active fiber interface. In these examples, conductive heat spreader 1451 may include a plurality of non-contiguous sections placed at different locations. The different sections may have the same or different size and the same or different shape. The conductive heat spreader 1451 (and in some examples the layer of potting compound by which it may be attached) may expose a remainder of the optical fiber.

Figure 15:
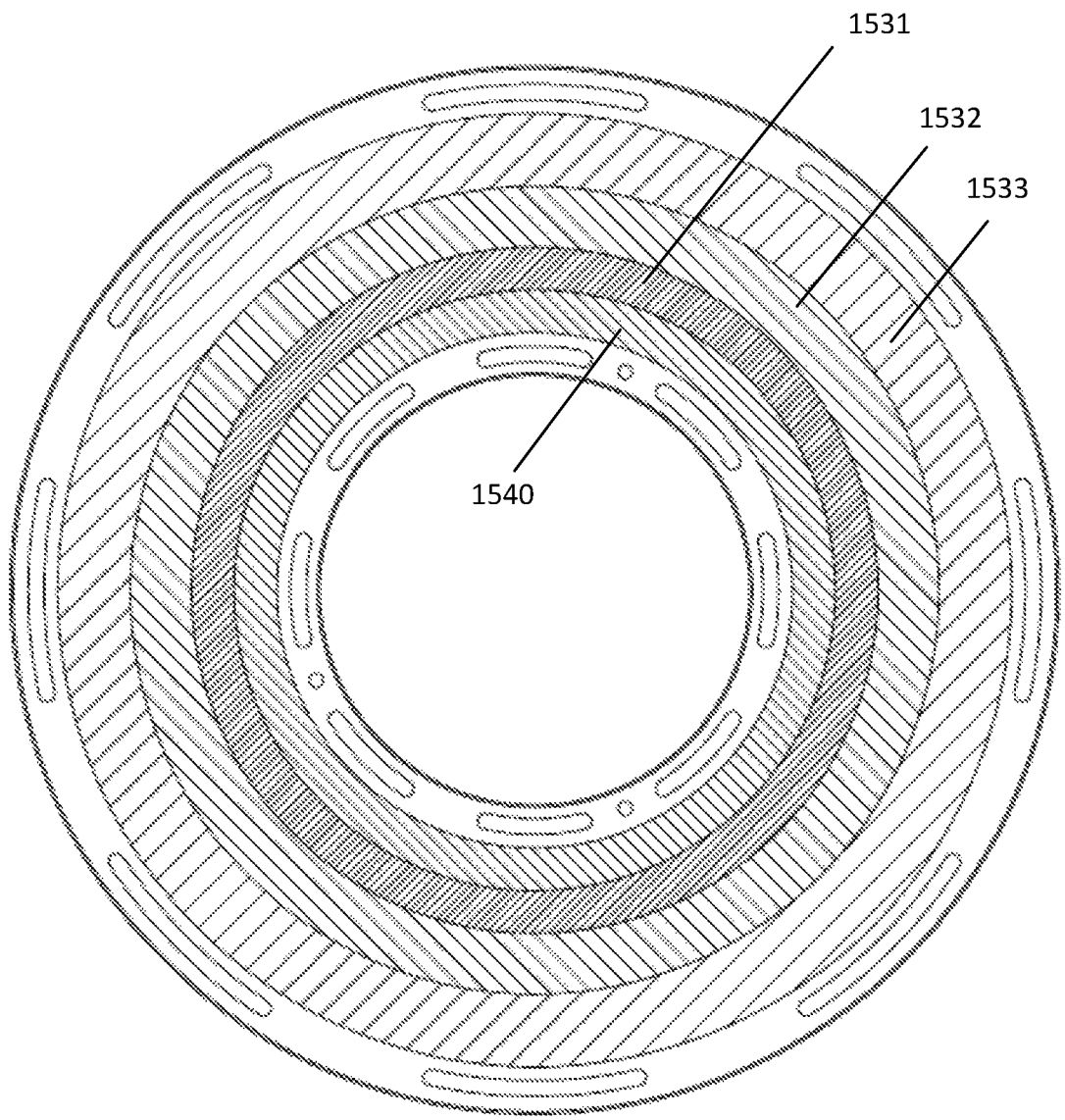
FIG. 15 illustrates a heat map for a coiled optical fiber, according to some embodiments.

FIG. 15 illustrates a heat map 1500 for a coiled optical fiber (e.g., a variably wound optical fiber), according to some embodiments. Hottest regions 1531-1533 may correspond to a length of fiber laser (e.g., a first section with the first separation distance 31 (FIG. 1)), and the coolest region 1540 may correspond to a different section of the optical fiber (the length with the second and third separation distances 32 and 33 (FIG. 1)). Hottest regions 1531-1533 may correspond to an oscillator (refer to graph 800 showing a heat signature for an oscillator, with progressively less heat build up along a length of the oscillator away from an interface), for instance, and coolest region 1540 may correspond to a different section (e.g., a passive section coupled to an oscillator, also shown in graph 800).

Figure 16:
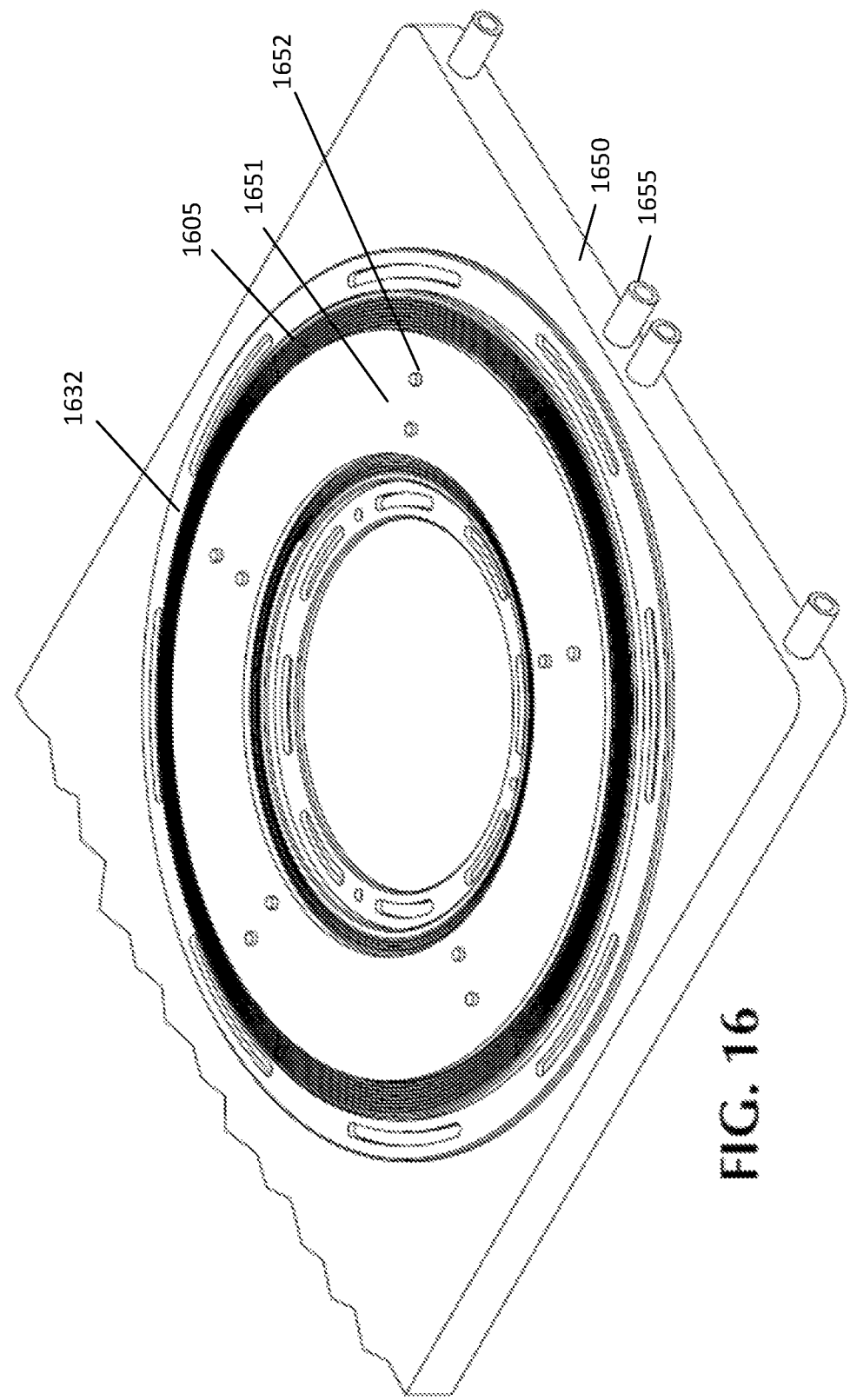
FIG. 16 illustrates a conductive heat spreader mounted over at least one entire loop of the coiled optical fiber heat-maped in FIG. 15, according to some embodiments.

FIG. 16 illustrates a conductive heat spreader 1651 mounted over at least one entire loop of the coiled optical fiber heat-maped in coiled optical fiber heat-maped in FIG. 15 (e.g., over the entire hottest loop(s)), according to some embodiments. In one example, the heat conductor 1632, the channel 1605, the cooling system 1650, and the tubing 1655 may be similar (respectively) to any heat conductor, channel, cooling system, and tubing described herein, such as the heat conductor 232, the channel 205, the cooling system 250, and the tubing 255 described with respect to the embodiment of FIGS. 2-5

The conductive heat spreader 1651 may be mounted over a portion of the variably wound optical fiber that may include the length with the first separation distance 31 (FIG. 1). The conductive heat spreader 1561 may be ring-shaped and may expose the length of the optical fiber including the second and third separation distances 32 and 33 (FIG. 1).

The conductive heat spreader 1651 may be fastened to the heat conductor 1632 using fasteners 1652 (e.g., screws, rivets, or the like, or combinations thereof). The fasteners 1652 may extend between loops separated by the first separation distance 31 (FIG. 1). A location and material of the fasteners 1652 may be selected to augment the heat path to the heat conductor 1632 (e.g., if a metal of the fasteners 1652 has a higher heat conductivity than the potting material it may be advantageous to arrange the fasteners 1652 so that one or more of the fasteners 1652 corresponds to a hottest region of the covered loops).

Figure 17:
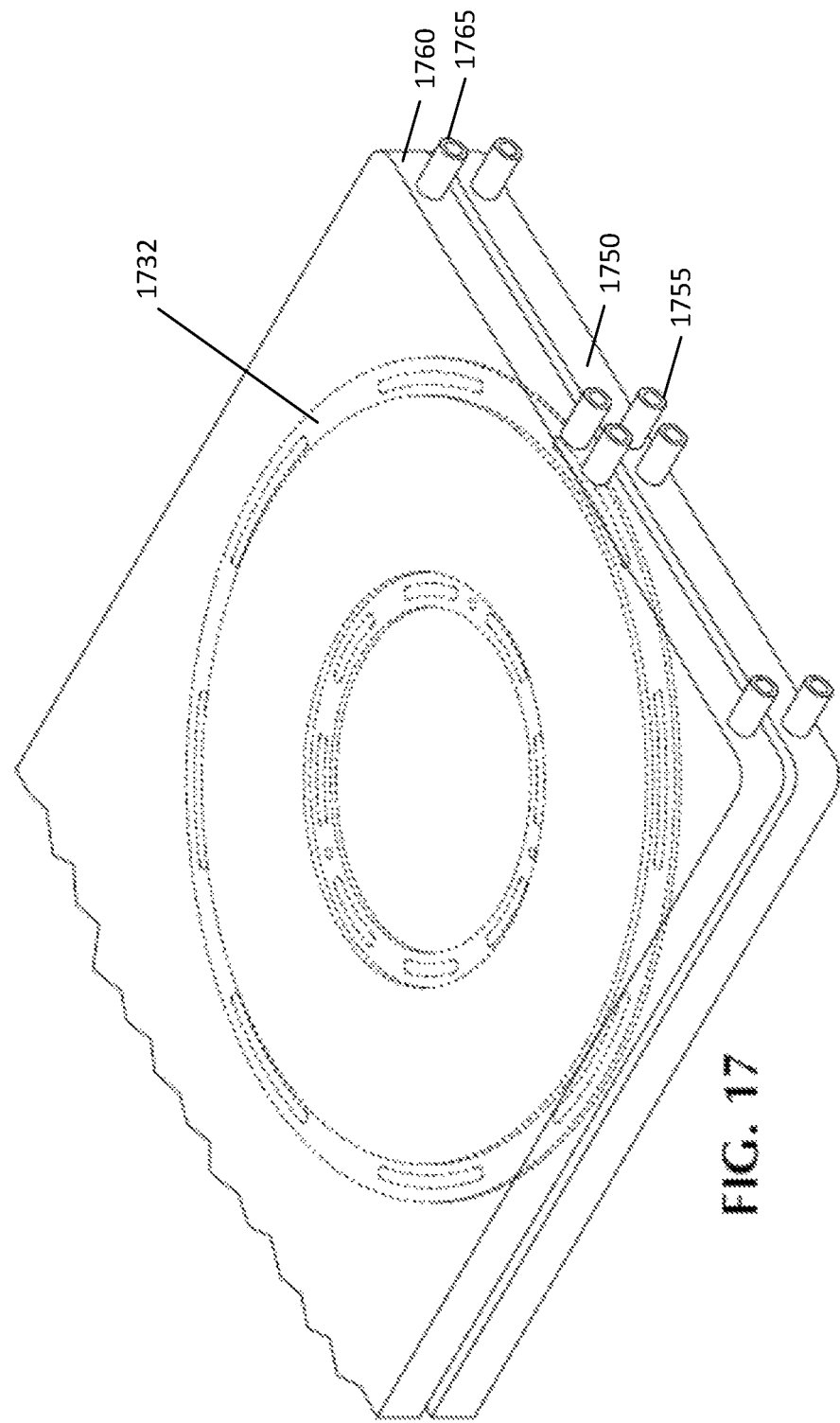
FIG. 17 illustrates dual active cooling systems enclosing a heat conductor having a wound optical fiber mounted thereon, according to some embodiments.

FIG. 17 illustrates dual active cooling systems 1760 and 1750 enclosing a heat conductor 1732 having a wound optical fiber (not shown, e.g., variably wound) mounted thereon, according to some embodiments. Heat conductor 1732 and cooling system 1750 may be similar to any heat conductor and cooling system described herein, such as heat conductor 232 and cooling system 250 of the embodiment described with reference to FIGS. 2-5. Cooling system 1760 may include a planar surface similar to a planar surface of cooling system 1750 that is coupled to an opposite side of the heat conductor 1732 as the optical fiber. The planar surface of cooling system 1760 may be in contact with the optical fiber and/or a potting compound deposited on and/or around the optical fiber (or top of walls of channels, or an edge of a ribbon, etc.). Heat received by the planar surface of the cooling system 1750 may travel in any direction toward cooling pipes 1765.

In the illustrated embodiment, the cooling systems 1750 and 1760 have symmetric tubing configurations, although this is not required. In some examples, the cooling systems 1750 and 1760 may have asymmetric tubing configurations (or may be shifted to provide a staggered arrangement of the tubing). Heat received at the planar surface of the cooling system 1760 may travel to a closes one of the pipes 1755 and 1765. If the closest one of the pipes 1755 and 1765 is one of the pipes 1755 of the other cooling system 1750 for a given location of the optical fiber, the heat generated by that given location may travel laterally through the surface of the heat conductor 1732, via potting material and/or walls of channels/ribbons (in embodiments that include channels or ribbons) toward the surface of the heat conductor 1750 (and vice versa). If the closest one of the pipes 1755 and 1765 for the given location of the optical fiber is a local pipe (e.g., one of pipes 1765 for the cooling system 1760), the heat generated by that given location may not necessarily travel through the potting material and/or walls of channels (and vice versa).

Figure 9:
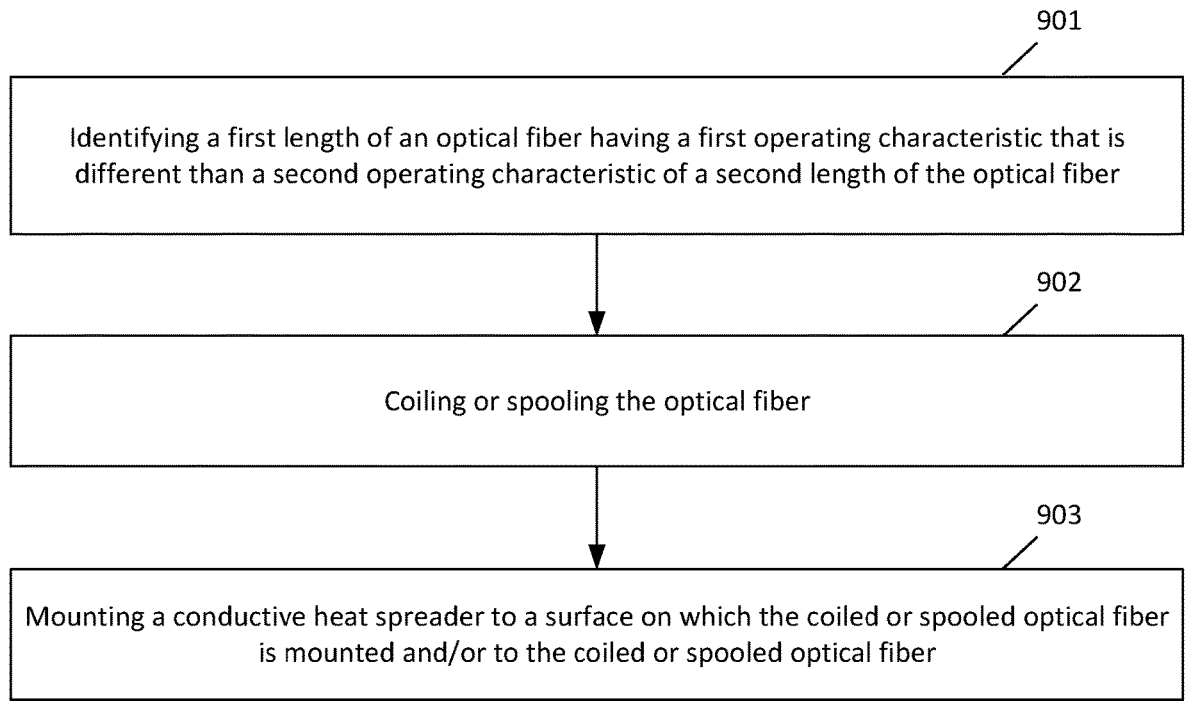
FIG. 9 illustrates a process of mounting a conductive heat spreader to a surface on which a coiled or spooled optical fiber is mounted and/or to the coiled or spooled optical fiber, according to some embodiments.

FIG. 9 illustrates a process 900 of mounting a conductive heat spreader to a surface on which a coiled or spooled optical fiber is mounted and/or to the coiled or spooled optical fiber, according to some embodiments. Block 901 may be similar to block 601 of FIG. 6. In block 902, the optical fiber may be coiled or spooled. In some examples, coiling or spooling may include coiling or spooling similar to block 602. In other examples, the optical fiber may be uniformly coiled or spooled in block 902.

In block 903, a conductive heat spreader may be mounted to a surface on which the coiled or spooled optical fiber is mounted and/or to the coiled or spooled optical fiber. In some examples, the conductive heat spreader may expose a portion of the optical fiber, e.g., at least a portion of the second length of the optical fiber.

Examples

Example 1 is a fiber laser, comprising: a variably wound optical fiber, wherein the variably wound optical fiber includes: a first length arranged in a plurality of first loops with a first separation distance between successive ones of the first loops; and a second length arranged in a plurality of second loops with a second separation distance between successive ones of the second loops; wherein the first separation distance between successive ones of the first loops is greater than the second separation distance between successive ones of the second loops; and packaging to remove heat generated by the optical fiber of the fiber laser during operation of the fiber laser, wherein the variably wound optical fiber is fixably mounted to a surface of a heat conductor of the packaging.

Example 2 includes the subject matter of example 1 or any other example herein, wherein the surface comprises a planar surface.

Example 3 includes the subject matter of examples 1-2 or any other example herein, wherein the surface comprises a non-planar surface.

Example 4 includes the subject matter of examples 1-3 or any other example herein, wherein the packaging includes a disc or an annular ring, and wherein the surface comprises a side of the disc or annular ring.

Example 5 includes the subject matter of examples 1-4 or any other example herein, wherein the heat conductor comprises a cylinder, and wherein the surface comprises an inner surface of the cylinder.

Example 6 includes the subject matter of examples 1-5 or any other example herein, wherein the heat conductor includes a cylinder, and wherein the surface comprises an outer surface of the cylinder.

Example 7 includes the subject matter of examples 1-6 or any other example herein, further comprising a lip surrounding the surface of the heat conductor, the lip defining a space to contain a potting material, wherein a first side of the optical fiber is contact with the surface and the potting material covers a second opposite side of the optical fiber.

Example 8 includes the subject matter of examples 1-7 or any other example herein, wherein the potting material comprises a first layer of potting material, and wherein the surface of the heat conductor comprises a second layer of the same or different potting material deposited on metal.

Example 9 includes the subject matter of examples 1-8 or any other example herein, further comprising a guide formed on or in the surface of the heat conductor, the guide including a first section to define the first separation distance and a second section to define the second separation distance.

Example 10 includes the subject matter of examples 1-9 or any other example herein, wherein the guide comprises a channel formed in the surface.

Example 11 includes the subject matter of examples 1-10 or any other example herein, wherein the planar surface comprises a first side of a heat conductor, and wherein the packaging further comprises a heat exchanger attached to a second opposite side of the heat conductor.

Example 12 includes the subject matter of examples 1-11 or any other example herein, wherein the heat exchanger is arranged to circulate liquid.

Example 13 includes the subject matter of examples 1-12 or any other example herein, further comprising liquid cooling pipes located below the non-planar surface.

Example 14 includes the subject matter of examples 1-13 or any other example herein, wherein the optical fiber comprises a first side and a second opposite side, wherein the first side of the optical fiber is mounted to the surface of the heat conductor, wherein the first separation distance is greater than the second separation distance; and wherein the packaging further comprises a heat spreader to expose the second side of the first length of the optical fiber, wherein the heat spreader is coupled to the second side of the second length of the optical fiber.

Example 15 includes the subject matter of examples 1-14 or any other example herein, wherein the heat spreader comprises a plurality of non-contiguous sections.

Example 16 includes the subject matter of examples 1-15 or any other example herein, wherein the conductive heat spreader comprises a plate mounted to the second side of the second length of the optical fiber.

Example 17 includes the subject matter of examples 1-16 or any other example herein, wherein the plate comprises an annular ring.

Example 18 includes the subject matter of examples 1-17 or any other example herein, wherein the plate is mounted to only a portion of the second length of the optical fiber.

Example 19 includes the subject matter of examples 1-18 or any other example herein, wherein the plate comprises a disc with a center located on a selected region of the second length of the optical fiber.

Example 20 includes the subject matter of examples 1-19 or any other example herein, wherein the selected region of the second length of the optical fiber is associated with an interface of a gain fiber of the optical fiber.

Example 21 includes the subject matter of examples 1-20 or any other example herein, wherein the optical fiber comprises a first side and a second opposite side, and wherein the packaging comprises a cooling system attached to the second side of the optical fiber.

Example 22 includes the subject matter of examples 1-21 or any other example herein, wherein the cooling system comprises a liquid cooler.

Example 23 includes the subject matter of examples 1-22 or any other example herein, further comprising fasteners attaching the conductive heat spreader to the heat conductor.

Example 24 includes the subject matter of examples 1-23 or any other example herein, wherein the fasteners are arranged between selected ones of the loops of the optical fiber, wherein the selected ones of the loops comprise ones of the first loops.

Example 25 includes the subject matter of examples 1-24 or any other example herein, further comprising a potting material in contact with the optical fiber, the potting material located between the optical fiber and metal of the thermal conductor and/or between the loops of the optical fiber.

Example 26 is an apparatus to dissipate heat from a wound fiber laser having a first length to operate differently than a second length of the wound fiber laser, the apparatus comprising: a planar heat sink including a first side to make contact with a cooling plate and a second side to make contact with both lengths of the wound fiber laser; a guide formed on the second side of the planar heat sink, the guide including: a first section to arrange a portion of the first length of the fiber laser into a first plurality of first turnings with a first separation distance between successive ones of the first turnings; and a second section to arrange a portion of the second length of fiber into a second plurality of turnings with a second separation distance between successive ones of the second turnings; wherein the first separation distance between successive ones of the first turnings is different than the second separation distance between successive ones of the second turnings.

Example 27 includes the subject matter of example 26 or any other example herein, wherein an operating power density of the first length is greater than an operating power density of the second length, and wherein the constant separation distance between successive ones of the first turnings is greater than a constant separation distance between successive ones of the second turnings.

Example 28 includes the subject matter of examples 26-27 or any other example herein, wherein the guide comprises a groove machined into the second side of the planar heat sink or a channel on the second side of the planar heat sink.

Example 29 includes the subject matter of examples 26-28 or any other example herein, wherein the guide comprises a third dimensional feature printed on the second side of the planar heat sink.

Example 30 includes the subject matter of examples 26-29 or any other example herein, wherein a first portion of the guide to correspond with the first turnings comprises a first material having a first thermal conductivity, and wherein a second portion of the guide to correspond with the second turnings comprise a second material having a second thermal conductivity that is different than the first thermal conductivity.

Example 31 includes the subject matter of examples 26-30 or any other example herein, wherein the planar heat sink comprises a plate.

Example 32 includes the subject matter of examples 26-31 or any other example herein, wherein the guide comprises one or more components attached to the second side of the planar heat sink.

Example 33 includes the subject matter of examples 26-32 or any other example herein, wherein the guide comprises a channel, and wherein a depth of a portion of the channel that corresponds to the first turnings is different than a depth of a portion of the channel that corresponds to the second turnings.

Example 34 includes the subject matter of examples 26-33 or any other example herein, wherein the guide comprises a channel having a uniform width from one end of the channel to another end of the channel.

Example 35 includes the subject matter of examples 26-34 or any other example herein, wherein the guide includes a third transition section between the first and second sections, the third transition section to arrange a portion of the first or second length of the fiber laser into a third at least partial turning.

Example 36 includes the subject matter of examples 26-35 or any other example herein, wherein a separation distance between the third at least partial turning and at least one of the first or second turnings comprises a non-constant separation distance.

Example 37 includes the subject matter of examples 26-36 or any other example herein, wherein the first separation distance comprises a first constant separation distance and the second separation distance comprises a second constant separation distance.

Example 38 includes the subject matter of examples 26-37 or any other example herein, wherein a shape of the third at least partial turning corresponds to a shape of a portion of a logarithmic spiral.

Example 39 includes the subject matter of examples 26-38 or any other example herein, wherein the third at least partial turning comprises a length that corresponds to a maximum bend radius of the fiber laser.

Example 40 includes the subject matter of examples 26-39 or any other example herein, wherein a shape of the first turnings or the second turnings corresponds to a shape of an arithmetic spiral.

Example 41 is an apparatus, comprising: a plate including a first side to couple to a cooling plate and a second side including a channel to receive a wound fiber laser; wherein the channel includes: a first spiral segment having a plurality of first turnings with a constant separation distance between successive ones of the first turnings; and a second segment having at least a partial second turning with a non-constant separation distance with respect to the first turnings.

Example 42 includes the subject matter of example 41 or any other example herein, wherein the channel further includes a third spiral segment connected to the first spiral segment by the second segment, the third spiral segment having a plurality of third turnings with a constant separation distance between successive ones of the third turnings, wherein the constant separation distance between successive ones of the first turnings is greater than the constant separation distance between successive ones of the third turnings.

Example 43 includes the subject matter of examples 41-42 or any other example herein, identifying a first length of a fiber laser having a different operating characteristic than a second length of the fiber laser; forming, on a side of a plate, a channel to receive the fiber laser, the channel including: a first segment including a plurality of first turnings with a first constant separation distance between successive ones of the first turnings; and a second compact segment including a plurality of second turnings, wherein at least one of the second turnings has a second separation distance with respect to a successive one of the second turnings, wherein the second separation distance is less than the first constant separation distance; inserting the first length of the fiber laser into the first segment of the channel; and inserting the second length of the fiber laser into the second compact segment of the channel.

Example 44 includes the subject matter of examples 41-43 or any other example herein, further comprising: identifying a characteristic of the fiber laser that is based on a degree of curvature; and selecting a length of a transition section of the second segment based on the characteristic, wherein a remaining section of the second segment includes uniformly spaced ones of the second turnings.

Example 45 includes the subject matter of examples 41-44 or any other example herein, wherein the transition section includes only a portion of the fiber laser of the second length of the fiber laser.

Example 46 is a fiber laser, comprising: a variably wound optical fiber, wherein the variably wound optical fiber includes: a length arranged in a plurality of loops with constant separation distance between successive ones of the loops; and packaging to remove heat generated by the optical fiber of the fiber laser during operation of the fiber laser, wherein the variably wound optical fiber is fixably mounted to a surface of a heat conductor of the packaging; wherein the optical fiber comprises a first side and a second opposite side, wherein the first side of the optical fiber is mounted to the surface of the heat conductor, wherein the packaging further comprises a heat spreader coupled to the second side of the optical fiber.

Example 47 includes the subject matter of example 46 or any other example herein, wherein the heat spreader comprises a plurality of non-contiguous sections.

Example 48 includes the subject matter of any of examples 46-47 or any other example herein, wherein the conductive heat spreader comprises a plate mounted to the second side of the optical fiber.

Example 49 includes the subject matter of any of examples 46-48 or any other example herein, wherein the plate comprises an annular ring.

Example 50 includes the subject matter of any of examples 46-49 or any other example herein, wherein the plate is mounted to only a portion of the second length of the optical fiber.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. A fiber laser, comprising:
a variably wound optical fiber, wherein the variably wound optical fiber includes:
a first section arranged in a plurality of first loops with a first constant separation distance between successive ones of the first loops; and
a second section arranged in a plurality of second loops with a second constant separation distance between successive ones of the second loops;
wherein the first constant separation distance between successive ones of the first loops is different than the second constant separation distance between successive ones of the second loops, and wherein the variably would optical fiber further includes a third section arranged in a third at least partial loop in which a third separation distance between the third at least partial loop and at least one of the first and second loops is non-constant; and
packaging to remove heat generated by the optical fiber of the fiber laser during operation of the fiber laser, wherein the first, second, and third sections of the variably wound optical fiber are fixably mounted to a single side of a heat conductor of the packaging.

2. The fiber laser of claim 1, wherein the single side comprises a planar surface.

3. The fiber laser of claim 2, wherein the packaging includes a disc or an annular ring, and wherein the single side comprises a side of the disc or annular ring.

4. The fiber laser of claim 2, wherein the single side comprises a first side of the heat conductor, and wherein the packaging further comprises a heat exchanger attached to a second opposite side of the heat conductor.

5. The fiber laser of claim 1, wherein the single side comprises a non-planar surface.

6. The fiber laser of claim 5, wherein the heat conductor comprises a cylinder, and wherein the single side comprises either an inner surface of the cylinder or an outer surface of the cylinder.

7. The fiber laser of claim 5, further comprising liquid cooling pipes located below the non-planar surface.

8. The fiber laser of claim 1, further comprising a lip surrounding the single side of the heat conductor, the lip defining a space to contain a potting material, wherein a first side of the optical fiber is contact with the single side and the potting material covers a second opposite side of the optical fiber, wherein the potting material comprises a first layer of potting material, and wherein the single side of the heat conductor comprises a second layer of the same or different potting material deposited on metal.

9. The fiber laser of claim 1, further comprising a guide formed on or in the single side of the heat conductor, the guide including a first section to define the first constant separation distance, a second section to define the second constant separation distance, and a third section to define the third non-constant separation distance.

10. The fiber laser of claim 9, wherein the guide comprises a channel formed in the single side.

11. The fiber laser of claim 1, wherein the optical fiber comprises a first side and a second opposite side, wherein the first side of the optical fiber in the first, second, and third sections is mounted to the single side of the heat conductor and wherein the packaging comprises a cooling system attached to the second side of the optical fiber in at least one of the first, second, or third sections.

12. The fiber laser of claim 1, wherein the optical fiber comprises a first side and a second opposite side, wherein the first side of the optical fiber in the first, second, and third sections is mounted to the single side of the heat conductor, wherein the first constant separation distance is greater than the second constant separation distance; and wherein the packaging further comprises a conductive heat spreader to expose the second side of the first section of the optical fiber, wherein the conductive heat spreader is coupled to the second side of the second section of the optical fiber.

13. The fiber laser of claim 12, wherein the conductive heat spreader comprises a plurality of non-contiguous sections or a plate mounted to the second side of the second section of the optical fiber.

14. The fiber laser of claim 13, wherein the plate comprises an annular ring or the plate is mounted to only a portion of the second section of the optical fiber.

15. The fiber laser of claim 14, wherein the plate comprises a disc with a center located on a selected region of the second section of the optical fiber.

16. The fiber laser of claim 15, wherein the selected region of the second section of the optical fiber is associated with an interface of a gain fiber of the optical fiber.

17. The fiber laser of claim 1, wherein the third at least partial loop has a minimal length optimized based on a maximum bend radius specification of the optical fiber.

18. The fiber laser of claim 12, further comprising fasteners attaching the conductive heat spreader to the heat conductor.

19. The fiber laser of claim 18, wherein the fasteners are arranged between selected ones of the loops of the optical fiber, wherein the selected ones of the loops comprise ones of the first loops.

20. The fiber laser of claim 1, further comprising a potting material in contact with the optical fiber, the potting material located between the optical fiber and metal of the heat conductor and/or between sides of the optical fiber.

* * * * *